(12) United States Patent
Hooshiari et al.

(10) Patent No.: US 10,084,911 B2
(45) Date of Patent: Sep. 25, 2018

(54) ACTIVE RECORDS FOR INTERACTIVE SYSTEMS

(71) Applicant: AT&T INTELLECTUAL PROPERTY I, L.P., Atlanta, GA (US)

(72) Inventors: Alireza Hooshiari, Alpharetta, GA (US); James W. Fan, San Ramon, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 316 days.

(21) Appl. No.: 14/483,829

(22) Filed: Sep. 11, 2014

(65) Prior Publication Data

US 2016/0080567 A1    Mar. 17, 2016

(51) Int. Cl.
*H04M 3/493*    (2006.01)
*H04M 3/42*    (2006.01)

(52) U.S. Cl.
CPC ....... *H04M 3/493* (2013.01); *H04M 3/42229* (2013.01)

(58) Field of Classification Search
CPC .......................... H04M 3/493; H04M 3/42229
See application file for complete search history.

(56) References Cited

U.S. PATENT DOCUMENTS

| | | | |
|---|---|---|---|
| 5,953,393 A | 9/1999 | Culbreth et al. | |
| 7,212,623 B2 | 5/2007 | Creamer et al. | |
| 7,245,711 B2 | 7/2007 | Margolis | |
| 7,865,607 B2 | 1/2011 | Sonalkar et al. | |
| 8,059,667 B2 | 11/2011 | Lean et al. | |
| 8,139,730 B2 | 3/2012 | Da Palma et al. | |
| 8,548,141 B2 | 10/2013 | Raghav et al. | |
| 8,594,013 B2 | 11/2013 | Wu | |
| 8,989,371 B2* | 3/2015 | Kaufman | H04M 3/42008 370/356 |
| 2002/0085701 A1 | 7/2002 | Parsons et al. | |
| 2005/0232253 A1* | 10/2005 | Ying | H04L 29/06027 370/356 |
| 2006/0004626 A1* | 1/2006 | Holmen | G06Q 30/02 705/14.26 |

(Continued)

OTHER PUBLICATIONS

U.S. Appl. No. 14/483,874 to James W. Fan et al., filed Sep. 11, 2014.

(Continued)

*Primary Examiner* — Stephen Hong
*Assistant Examiner* — Hope C Sheffield
(74) *Attorney, Agent, or Firm* — Greenblum & Bernstein, P.L.C.

(57) ABSTRACT

A personalized interactive service is provided by setting a profile of an individual for use by an entity that provides the interactive service. At least a portion of the profile is set independent of any network communication session between the individual and the entity. A personalized interactive script is personalized for the individual in the event that the individual initiates a communication with the entity to obtain the interactive service. The personalized interactive service is provided to the individual when the personalized interactive script is executed based on the individual initiating a communication session between the individual and the entity.

20 Claims, 15 Drawing Sheets

(56) References Cited

U.S. PATENT DOCUMENTS

| | | |
|---|---|---|
| 2007/0118604 A1* | 5/2007 | Costa Requena ..... H04L 12/581 709/206 |
| 2008/0155659 A1* | 6/2008 | Gazier .................... H04L 63/08 726/4 |
| 2008/0310312 A1 | 12/2008 | Acharya et al. |
| 2009/0059897 A1 | 3/2009 | Anantharaman et al. |
| 2011/0154209 A1 | 6/2011 | Fan et al. |
| 2011/0158397 A1 | 6/2011 | Simoes et al. |
| 2011/0161875 A1* | 6/2011 | Kankainen ............ G06F 3/0481 715/810 |
| 2012/0208526 A1 | 8/2012 | Fisher et al. |
| 2013/0238708 A1* | 9/2013 | Bustamente ........ H04L 61/3085 709/204 |
| 2013/0326354 A1* | 12/2013 | Anderson .......... G06Q 30/0241 715/733 |
| 2014/0082505 A1* | 3/2014 | Watson ................ G06F 3/0484 715/738 |
| 2014/0280991 A1* | 9/2014 | Lederman ............. H04L 67/306 709/228 |
| 2016/0036983 A1* | 2/2016 | Korolev ............. H04M 3/5233 379/265.12 |

OTHER PUBLICATIONS

"Developing SIP and IP Multimedia Subsystem (IMS) Applications", Bazot et al. (2007).

* cited by examiner (Existing or New Customer)

SA IVR

Figure 15

| Calling Number/ IP Address 1501 | Address 1511 | Open | Contact History 1530 |
|---|---|---|---|
| Name 1502 | Family/Friend Customers/ Subscribers 1512 | Customer/ Subscriber Groupings 1522 | Contact #1 1541 |
| Account # 1503 | Account Password/ Identifiers 1513 | Subscriptions 1523 | Contact #2 1542 |
| Account Level 1504 | Income 1514 | Open | Contact #3 1542 |
| Marital Status 1505 | Community 1515 | Open | Open |
| Dependent Information 1506 | Community Groups 1516 | Open | Open |
| Health Information 1507 | Social Networks/ Usernames 1517 | Open | Open |
| Complaint History 1508 | Upcoming Date 1518 | Escalation 1528 | Open |
| Purchase History 1509 | Notable Event 1519 | Characteristic Code 1529 | Contact Pattern(s) 1549 |

ACTIVE RECORDS FOR INTERACTIVE SYSTEMS

BACKGROUND

1. Field of the Disclosure

The present disclosure relates to the field of interactive response systems. More particularly, the present disclosure relates to preparing personalized active records for use in interactive response systems.

2. Background Information

Enterprise call centers today may offer multiple channels to customers/callers for communication needs. Most customers/callers to a call center today still go through an interactive voice response (IVR) system to provide information such as identity, account number and the purpose of the call. Conventional IVR systems use one or more interactive scripts to guide callers through a static flow with prerecorded questions.

BRIEF DESCRIPTION OF THE DRAWINGS

FIG. 15 shows an exemplary profile template for active records for interactive systems, according to an aspect of the present disclosure.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
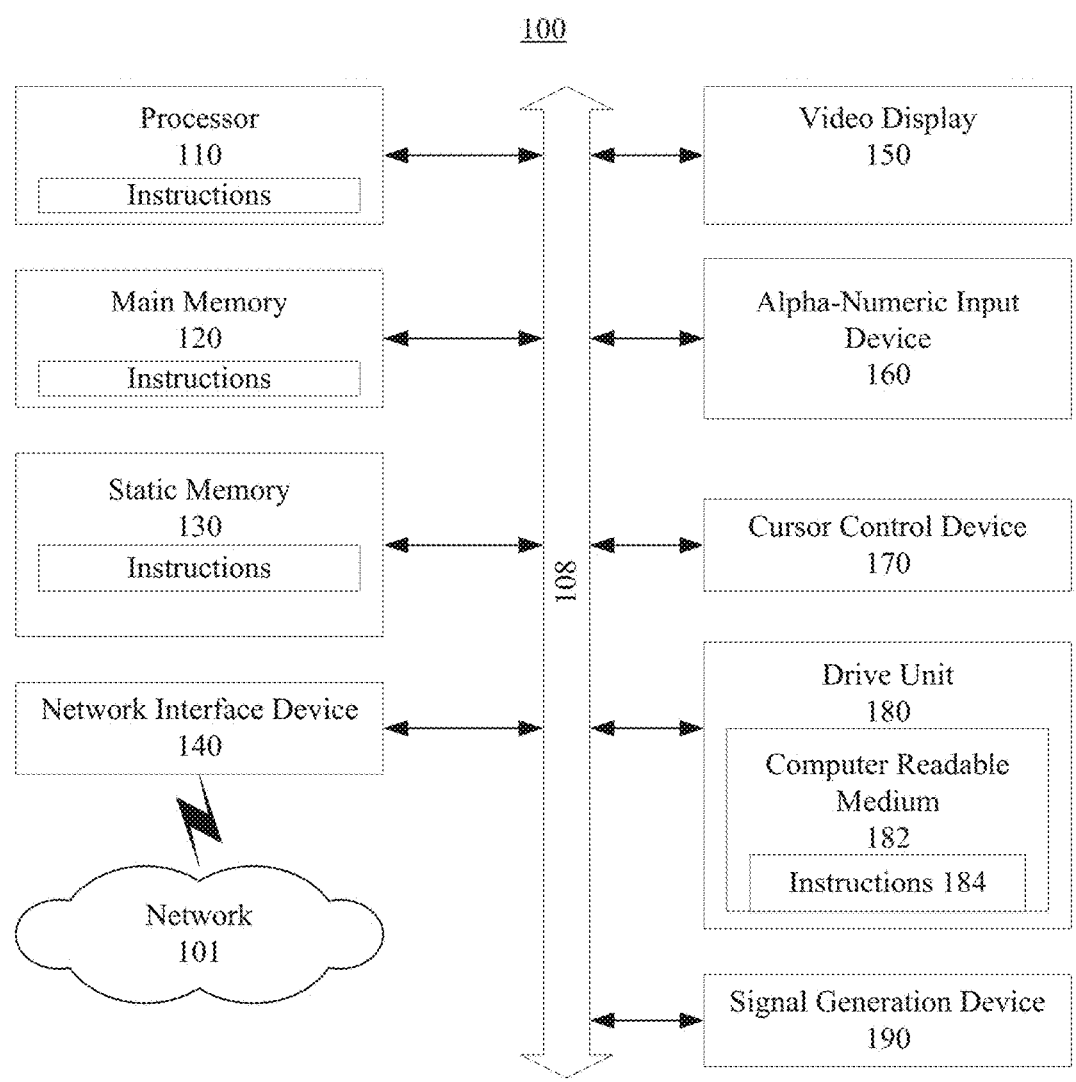
FIG. 1 shows an exemplary general computer system that includes a set of instructions for active records for interactive systems.

FIG. 1 is an illustrative embodiment of a general computer system, on which a method of active records for interactive systems can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as an call interceptor, an IVR, a context manager, an enrichment sub-system, a message generator, a message distributor, a rule engine, an IVR server, an interface server, a record generator, a data interface, a filter/enhancer, a script engine, a PBX, stationary computer, a mobile computer, a personal computer (PC), a laptop computer, a tablet computer, a wireless smart phone, a personal digital assistant (PDA), a global positioning satellite (GPS) device, a communication device, a control system, a web appliance, a network router, switch or bridge, a web server, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Active records as described herein are records maintained persistently by an entity in order to prepare for communications from persons described by the active records. The records may be updated before any communications are received by the persons, or between communications from the persons. The records are personalized for each person, so that an interactive script can be prepared specifically for the person. A personalized service is then provided to the person based on the personalized interactive script.

As an example, a company may wish to create a record when a customer signs up for a credit or other form of customer account at a physical retail location. The customer may fill out contact information, and receive an electronic card, a keychain attachment electronic token, or other form of identification for the customer account. Separately, the company may then create a contextual active record for the customer, in the event the customer attempts to contact the company over a communications network such as by calling or visiting a website.

Of course, active records and personalized scripts can be created or updated also at the time communications are initiated. For example, session Initiation Protocol (SIP) is a signaling communication protocol used in communication networks to initiate and control communication sessions. Session initiation protocol messages can be used to initiate and control communication sessions such as voice and video calls over Internet Protocol (IP) networks. Communications that can be initiated using session initiation protocol include, but are not limited to, internet conferencing, telephony and instant messaging sessions. Communication services that can be provided using session initiation protocol include interactive services such as IVR services.

Session initiation protocol defines messages that are sent between endpoints such as a user device and an interactive system such as an IVR system in order to, for example, initiate or terminate a communication session between the endpoints. A session initiation protocol message is used to initiate a communication to visit an address, such as when a user types in a web-site's URL. Session initiation protocol also provides for other messages as described herein, including messages to indicate an end to communications, or that a destination is being run, or acknowledgements. In the description herein, headers in session initiation protocol messages are typically where supplemental data is inserted after the session initiation protocol messages are intercepted.

In the present disclosure, a session initiation protocol message is sent to initiate a communication with a system that provides interactive services, such as an IVR system. A standard session initiation protocol message can be used in a conventional manner while also using the session initiation protocol message in the manner described herein.

Figure 2:
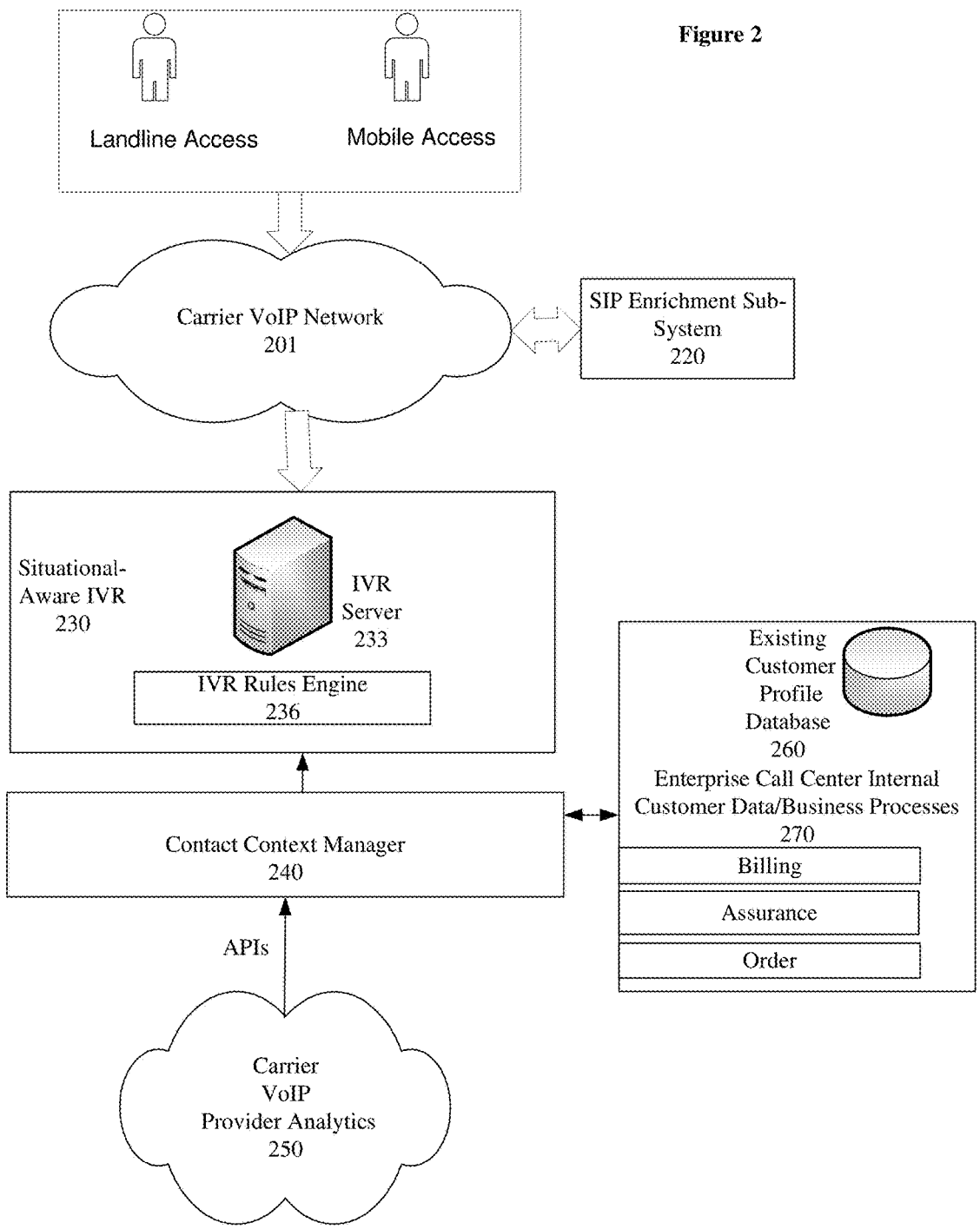
FIG. 2 shows an exemplary network for active records for interactive systems, according to an aspect of the present disclosure.

FIG. 2 shows an exemplary network for active records for interactive systems, according to an aspect of the present disclosure. In FIG. 2, an overview is provided for a network that includes a session initiation protocol enrichment sub-system 220, a situational-aware IVR 230, and a contact context manager 240. As described herein, a session initiation protocol message can be intercepted by the session initiation protocol enrichment sub-system 220 before reaching a recipient system such as a situational-aware IVR 230. Further, even after a communication is set up based on the session initiation protocol message reaching the situational-aware IVR 230, additional context information can be provided from the contact context manager 240. Thus, context information can be provided both before a communication is set-up and after the communication begins.

In FIG. 2, landline or mobile access is provided for users to communicate via a carrier voice over internet protocol (VoIP) network 201. The carrier network 201 may of course be a different kind of communication network such as a cellular network, a conventional public switched telephone network or advanced intelligent network, a cable network and so on. Additionally, a combination of different kinds of networks may be used instead of a particular carrier voice over internet protocol network.

The voice over internet protocol network 201 is representative of a modern telecommunication carrier network. Such modern telecommunication networks may include legacy service control points from the legacy advance intelligent network, or may include more modern alternative messaging controllers. Session initiation protocol messages may be transmitted through a stand-alone messaging network used to control a telecommunication carrier network, or may be transmitted through the same data network that is used to carry, e.g., voice communication, over a telecommunication carrier network. Additionally, while session initiation protocol has been in use for a time, any alternative messages with a similar purpose and function of initiating communication can be used in the same manner as session initiation protocol messages.

Additionally, although not shown for every embodiment, an automated call distributor (ACD) may be used to distribute calls for both concentrated and distributed call centers. An automated call distributor may serve as an interface between the internet protocol network 201 and a call center that includes the situational-aware IVR 230.

The communication from a user begins with a session initiation protocol message that is intercepted in the carrier voice over internet protocol network. The session initiation protocol message is provided to the session initiation protocol enrichment sub-system 220 where the session initiation protocol message is parsed and context information is inserted before the session initiation protocol message is returned to the carrier voice over internet protocol network 201 to complete the route to the situational-aware IVR 230. At the situational-aware IVR 230, an IVR server 233 is used to provide interactive services to the user across the carrier voice over internet protocol network 201. The communications between a user and any IVR described herein are bidirectional, wherein speech may be both sent and received simultaneously by the user and IVR. A conventional IVR provides interactive services using a predetermined hierarchical script in which sequential prompts are varied based on each input or lack of input by a user. As an example, a particular script is conventionally selected based on a telephone number dialed by a user. A situational-aware IVR 230 however selects a script in part based on the context information provided via the session initiation protocol enrichment sub-system 220.

The IVR server 233 interacts with the user based on rules provided by IVR rules engine 236. The IVR rules engine 236 analyzes context information provided via the session initiation protocol message and either alters the selection of a script or varies the prompts in a script based on the context information rather than only on any particular input provided by the user. Variations to a script can include additions or deletions of prompts, rearrangement of an order in which prompts are played, creation of an entirely new and even unique prompt to play first to a user before presenting any list in a script, or other forms of variations to a script.

As described herein, a situational-aware IVR 230 can select a script based on context information provided via an enhanced session initiation protocol message. The script may already be personalized for the caller based on an active record maintained for the caller, such as by periodic updating. The IVR rules engine may also dynamically obtain and receive information from other sources that help to determine whether and when to alter the selection of a script or vary the prompts in a particular script. In this regard, the IVR rules engine 236 receives input from a contact context manager 240, which in turn receives application protocol interfaces from carrier voice over internet protocol provider analytics 250 and from enterprise call center internal customer data/business processes 270.

The enterprise call center internal customer data/business processes 270 is provided via a system that also includes existing customer profile database 260. In this way, an entity that has information about its existing or new customers, including billing, assurance and order information, as well as profile information for a person holding an account, can identify relevant pre-existing information from the account to provide to the contact context manager 240. Profile information may include demographic information that is descriptive of the party initiating the communication, such as name, age, race, gender, income, credit, home address, marital status, and so on. An example of a contextual active record that can serve as a profile is shown later in FIG. 15. Billing information may include information such as whether a customer is behind on a bill, or whether the customer has disputed a particular charge. Order information may include information on open and completed orders.

The profile maintained by the customer profile database 260 may be the contextual active record described herein, or may be limited to information specifically derived from a person's relationship with the company. A profile in a customer profile database 260 may be first set when the customer establishes a contractual relationship with the entity, such as by signing up for a communication service or signing up for an account at a retail company.

Carrier voice over internet protocol provider analytics 250 may include analytic information determined from analysis of communications placed only to the situational-aware IVR 230, or to a series of IVRs including the situational-aware IVR 230. The analytics 250 may also be based on analysis of a particular predetermined hierarchical script, or based on numerous hierarchical scripts. Analytics information derived from analyzing the calls involving the IVRs and scripts is provided to the contact context manager 240 for use in helping the contact context manager decide what information is particularly relevant to the particular call for the particular communication initiated using the session initiation protocol message.

As described, the enterprise call center internal customer data and business processes 270 and the existing customer profile database 260 are used to facilitate operations for the situational-aware IVR 230 as well as to facilitate provisioning contextual data for the contact context manager 240. Additionally, the carrier voice over internet protocol provider analytics are also used to provide context and generalized analysis results for customer data to the contact context manager 240. Context information may include many different types of data including basic information such as caller profile information, location, subscription information, known preferences, and information suggestive of a reason the caller may be calling.

Although not shown in FIG. 2, context information may also be provided from other sources, including desktops applications installed on a user's customer equipment and dedicated to customer care services of the sort provided also by the situational-aware IVR 230. Such desktop applications are in use today, and can be used in the same or a similar manner as social network applications and other 3rd party systems that may contain useful information that may help resolve any problems leading to a caller calling the situational-aware IVR 230.

Contextual information may include information available implicitly from calls automatically, such as a caller's phone number, a location of a caller, and information derivable from the caller's phone number and location. Additionally, explicit contextual information may be obtained by asking the caller directly, or by searching known data stores including customer information for a business entity that provides an IVR system. This explicit information may include account numbers, phone numbers different from the calling phone number, pass code, script menu selections, account subscription information, information from social networks, trouble status for existing trouble tickets, support and order status for existing orders, outage information that the caller may be calling about and so on. Outage information may be based on previous reports from other customers or company personnel, or may be based on proactive line testing performed based on the caller initiating the call. Contextual information may also be derived contextual information obtained based on applying implicit and explicit attributes based on rules or using models. Derived contextual information can include contextual data that does not already exist, such as predicted usage information or a prediction of a service that is to be offered to a caller. Derived contextual information may also include Big Data analytic results derived from analyzing large amounts of information for a large group of people with similar demographic characteristics to the caller. Big Data analytics may be provided from the entity that provides the IVR system, may be provided by the telecommunication carrier that carries the communication to the entity that provides the IVR system, or may be provided by a 3rd party analytic firm.

Accordingly, an active context record may be supplemented at the time of a call using enhanced data provided in a session initiation protocol message, message from other sources as processed by a contact context manager 240, and the contextual active records described herein. As such, a situational-aware IVR 230 may execute a personalized interactive script based on both predetermined template scripts, information provided automatically at the time of a call, profile information maintained by the entity, and the contextual active records that are built and actively maintained for the entity for use in personalized interactive communications.

Figure 3:
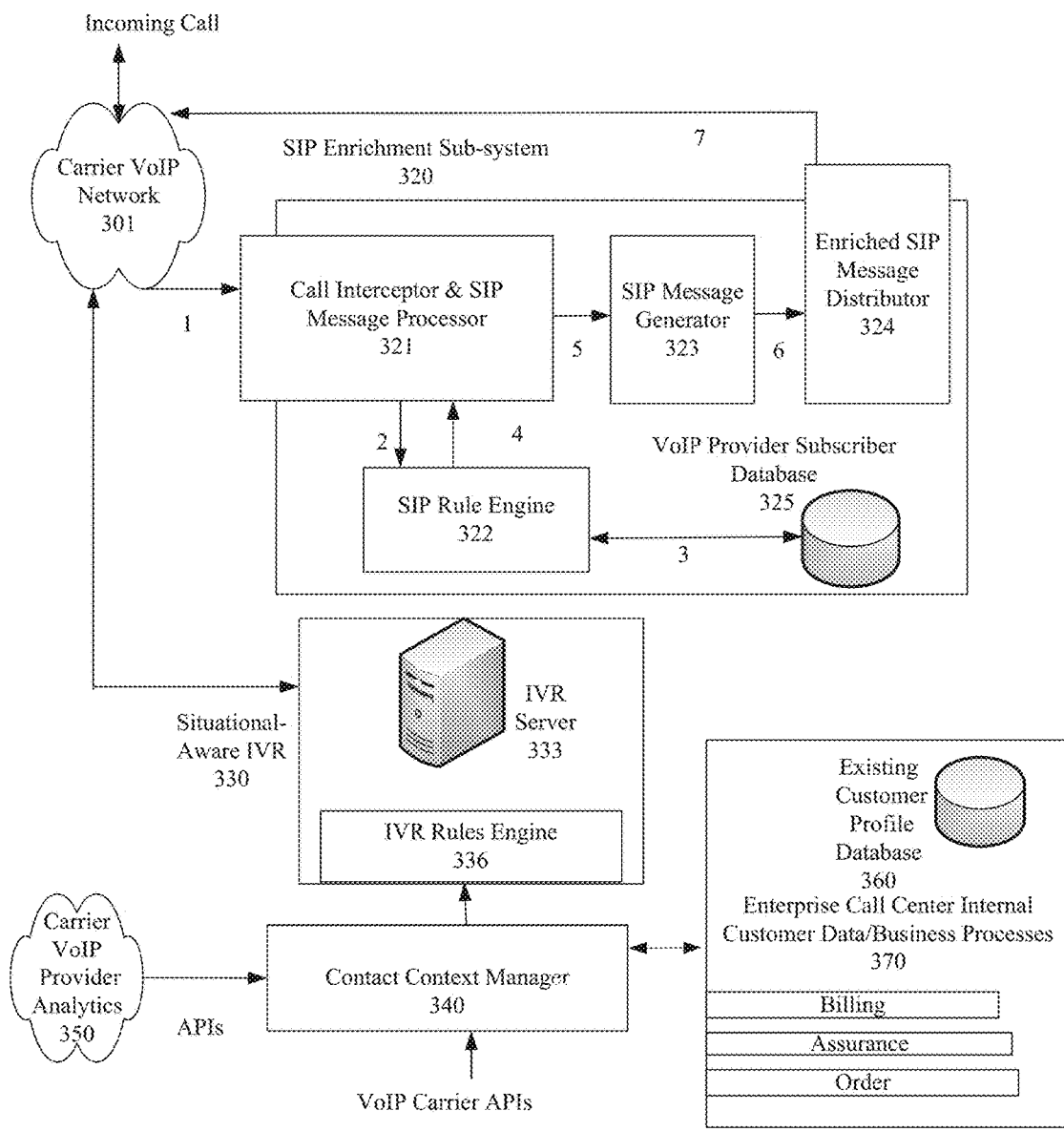
FIG. 3 shows another exemplary network for active records for interactive systems, according to an aspect of the present disclosure.

FIG. 3 shows another exemplary network for active records for interactive systems, according to an aspect of the present disclosure. In FIG. 3, an incoming session initiation protocol message is intercepted in a carrier voice over internet protocol network 301 on the way to situational-aware IVR 330, and redirected to SIP enrichment sub-system 320. The SIP enrichment sub-system 320 includes a call interceptor and SIP message processor 321, a SIP rule engine 322, a VoIP provider subscriber database 325, a SIP message generator 323, and an enriched SIP message distributor 324.

Interception as described herein may be accomplished by having a called number or other form of communication address or recipient information registered in a line information database or equivalent, such as a service control point or equivalent for VoIP networks. For example, if an enterprise decides to use the session initiation protocol interception described herein for contextual data supplements, the enterprise can pre-register the called number of other form of communication address or recipient information registered in the database. A session initiation protocol invite message can be used to validate the communication address or other information to confirm the registration in the database. If registered, the invite message will be intercepted.

Also, to avoid possible privacy issues, a caller can be given an option to opt-in to a contextual enhancement feature at subscription, so that a caller's contextual information is not provided without the caller's permission. This opt-in may be provided for all contextual information, or only a limited set of contextual information that may be particularly sensitive. The opt-in may also be provided as a per-call option for the caller to opt-in in order to help the caller save time. Alternatively, a subscriber may be informed of a contextual enhancement feature via text so that the subscriber can respond on a one-time, trial, or limited-time basis. The subscriber can also be asked audibly when the reach the self-service portion of an interactive service.

As noted, a destination address may be something other than a 10 digital phone number, such as when network address translation is not used. For example, a destination internet protocol address may be used for the interception address registered as the destination address in the database.

The call interceptor and SIP message processor 321 intercepts a SIP message in the carrier VoIP network 301, or receives an intercepted message intercepted by a specially-modified router in the carrier VoIP network 301. The call interceptor and SIP message processor checks with the SIP rule engine 322 to identify rules associated with the caller for which the session initiation protocol message is being sent. The SIP rule engine 322 checks the VoIP provider subscriber database 325 for rules associated with the particular caller, retrieves the rules and/or information based on the rules, and provides the rules and/or information based on the rules back to the call interceptor and SIP message processor 321. The call interceptor and SIP message processor 321 provides the rules and/or information based on the rules to the SIP message generator 323. The SIP message generator 323 generates a new session initiation protocol message based on the previous session initiation protocol message but with contextual information inserted into the header.

If the contextual information cannot be fitted to the header of the session initiation protocol message, the header may be provided with a Boolean or other form of code to show that contextual information is embedded into the session initiation protocol message body. The information embedded in the message body can include but is not limited to (a) all contextual information such as location or environmental information, (b) or a uniform resource locator that points to a retrievable address that the contact context manager 440 can use to retrieve all contextual information one time or continuously.

The session initiation protocol message generated by the SIP message generator 323 may be an update to the intercepted session initiation protocol message, or may be a newly assembled session initiation protocol message. Additionally, the information inserted into the header of the session initiation protocol message may be a specific rule from the SIP rule engine 322, information obtained based on a rule from the VoIP provider subscriber database 325 or other information including encoded message that is encoded so as to fit into the session initiation protocol message header. When encoded, the information may be encoded by the SIP message generator 323, by the call interceptor and SIP message processor 321, or by the SIP rule engine 322.

The modified session initiation protocol message is provided back to the carrier VoIP network 301, which then forwards the modified (enriched) session initiation protocol message to the situational-aware IVR 330. The situational-aware IVR 330 includes an IVR server 333 and an IVR rules engine 336. The IVR server 333 agrees to accept the incoming call and sets up the incoming call for processing, and the IVR rules engine 336 identifies a script to use and any appropriate modifications to make to the script based on the information provided in the header of the modified (enriched) session initiation protocol message.

The information inserted into the modified (enriched) session initiation protocol message is supplemental to any information that is automatically already provided with a call or any information that is voluntarily provided later by the user making the call. Thus, the inserted information is supplemental, and the session initiation protocol message is enhanced with the inserted supplemental information. The information inserted into the session initiation protocol message may be one or more pieces of demographic information descriptive of the user, location information descriptive of a location of the user, or even information that summarizes in some way previous interactions with the user. A summary of previous interactions may be as simple as information that notes the user has an ongoing complaint with the entity that provides the situational-aware IVR 330.

Though not fully described yet for this embodiment, the contact context manager 340 also provides contextual information to the IVR rules engine 336. The additional contextual information can be provided from carrier VoIP provider analytics 350 via application programming interfaces (APIs), can be from customer profile information for existing customer profile in database 360, or can be from enterprise call center internal customer data/business processes 370.

In an embodiment, contextual information may be continuously updated based on caller movements when the caller is using a mobile communication device such as a smart phone. For example, contextual information may provide a specific location for the caller, nearby stores or businesses, upcoming roads and detours when in a car, and so on. As described herein, for a contextual active record the contextual information may also be built and maintained before any communication from a caller, and between calls from a caller.

It should also be noted here that callers may also provide explicit contextual information via their communication device, such as by providing a caller's actual telephone number when the caller is using someone else's phone to place a call. The caller's actual telephone number may be inserted into the session initiation protocol message along with an account number or identifier provided explicitly by the caller. The session initiation protocol message can then carry the information provided explicitly by the caller to be ready for use by the IVR system in preparing for interactions.

As described, the SIP enrichment sub-system 320 uses implicit contextual information available from the VoIP provider to enrich an information management system (IMS) session initiation protocol message for transferring the implicit context data to the situational-aware IVR 330. However, the modified (enriched) session initiation protocol message may be provided to the contact context manager 340 through the situational-aware IVR 330, so that the contact context manager manages all contextual information to be used by the IVR rules engine 336 in selecting or modifying a script.

Additionally, the SIP enrichment sub-system 320 is described as using existing internal information and rules from, e.g., the VoIP provider subscriber database 325 in order to obtain the contextual information to provide with the modified (enriched) session initiation protocol message. However, the SIP enrichment sub-system 320 may interact with multiple contextual data sources, including location servers, product databases, purchase record databases and so on, to create a data object to insert into the session initiation protocol message header.

Figure 4:
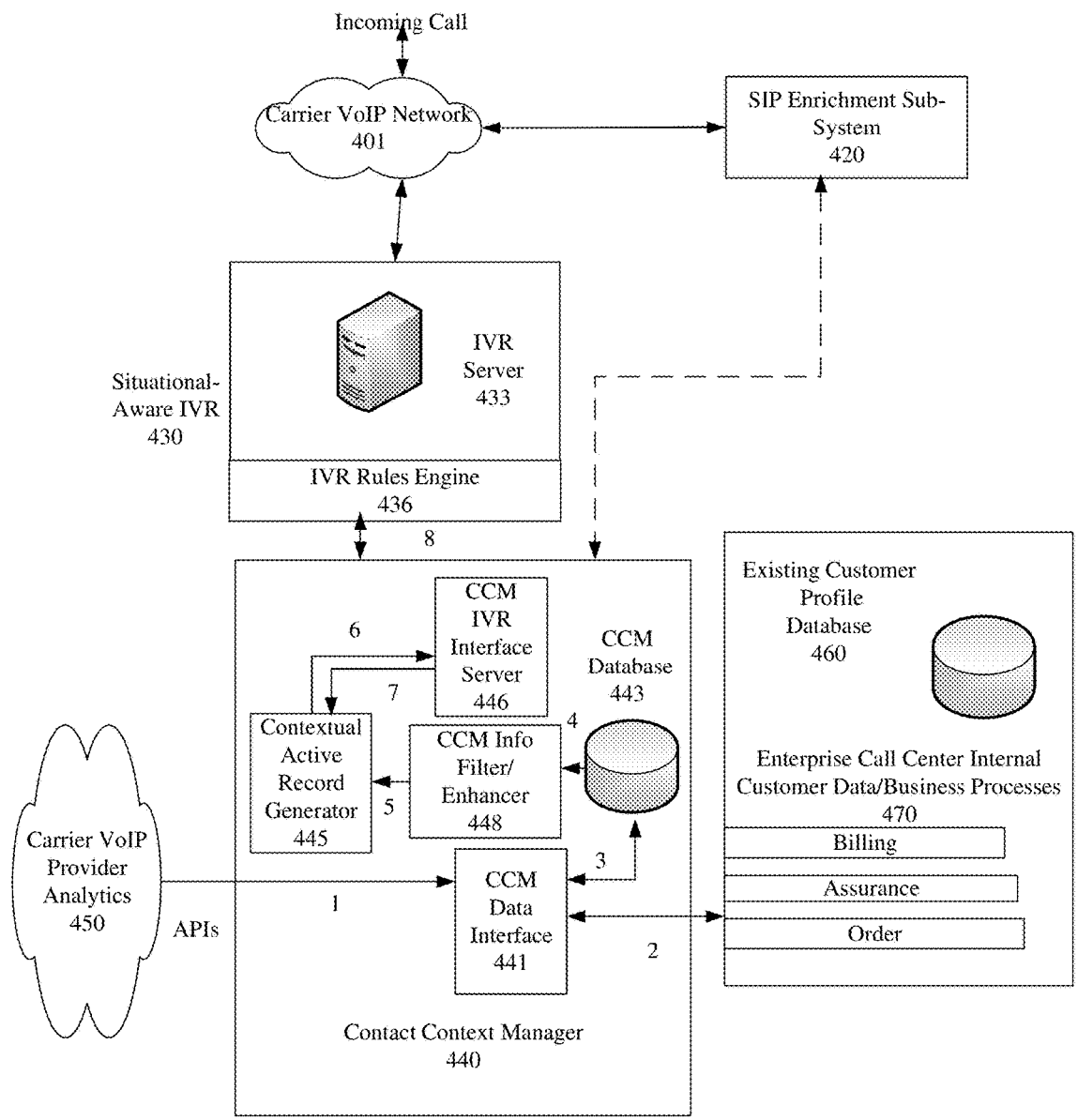
FIG. 4 shows another exemplary network for active records for interactive systems, according to an aspect of the present disclosure.

FIG. 4 shows another exemplary network for active records for interactive systems, according to an aspect of the present disclosure. In FIG. 4, an incoming session initiation protocol message for a call is carried across a carrier VoIP network 401 and intercepted by or for the SIP enrichment sub-system 420. The SIP enrichment sub-system 420 operates in the same manner as the SIP enrichment sub-system 320 in the embodiment of FIG. 3.

When the modified (enriched) session initiation protocol message is returned to the carrier VoIP network 401, it is passed through to the original destination which is the situational-aware IVR 430. The situational-aware IVR 430 includes an IVR server 433 and an IVR rules engine 436, each of which operate in the same manner as the IVR server 333 and IVR rules engine 336 in the embodiment of FIG. 3.

The situational-aware IVR 430 relies on the contact context manager 440 to manage contextual information, both from the session initiation protocol message and from other sources, in the embodiment of FIG. 4. As an example, the contact context manager 440 may receive APIs from carrier VoIP provider analytics 450. The APIs provide analytics information reflective of and based on analysis of large volumes of information. The analyzed information may be information limited to the particular caller, such as studies of numerous calls by the caller or others using the caller's account, information related to people with one or more demographic characteristics similar to the caller, or information related to people with habits, such as purchase histories, similar to the caller.

Additionally, the enterprise call center internal customer data business processes 470 and existing customer profile database 460 may be used to provide information to the contact context manager 440. The contextual information is provided to the contact context manager (CCM) data interface 441, which in turn provides the contextual information to the CCM database 443. A CCM information filter/enhancer 448 filters the contextual information to a limited amount determined most likely to be useful to incoming call. A contextual active record generator 445 may piece the various filtered and/or enhanced contextual information into a contextual active record, and interact with a CCM IVR interface server 446 to provide the context information to the situational-aware IVR 430 so that a particular script can be selected, or modified, based on the contextual information. The CCM information filter/enhancer 448 may filter the contextual information provided by eliminating information deemed most likely to not be relevant to an incoming call. The CCM information filter/enhancer 448 may also enhance the contextual information provided by supplementing the contextual information to "fill in the blanks" or by combining pieces of otherwise disparate contextual information to form a more complete contextual active record that may be relevant to the incoming call.

As an example, contextual information may show that a caller has recently purchased and activated a smart phone on a particular wireless carrier, and that the caller has an existing complaint with another wireless carrier. When the existing wireless carrier receives these disparate pieces of contextual information, the existing wireless carrier may "guess" that the incoming call is to cancel the existing service. A particular prompt may be added to a script by the situational-aware IVR 430 to ask if the caller would like information about how to cancel service.

In another example, contextual information may show that a caller calling a car company number has a particular car from the car company, and may show that a particular recall was just issued for the car. In this way, a caller calling even a general help or information line for the car company may be presented with a prompt asking if the caller would like information about a recent recall that may affect the particular car owned by the caller.

In still another example, contextual information may show that a caller's close family member has an upcoming birthday. When the caller is calling a type of business that caters to a demographic group that includes the close family member, the business may modify a script to ask the caller up-front whether the caller is searching for a gift for the upcoming birthday. In other examples, a business that caters to particular religious groups or ethnic groups or income groups may determine that a caller or a close family member of the caller belongs to the particular group, and may be interested in purchasing an item for an upcoming holiday or other observable date. In still other examples, an entity such as a ticket brokering service may identify contextual information such as concerts previously attended by the caller, or artists "liked" by the caller on a social network, and check for upcoming concerts in the area of the caller by such artists. In all of these instances, a script is selected, or modified, based on the contextual information as described herein. Additionally, a person's activity on a social network may be monitored, for example daily or weekly or monthly, or based on particular searches performed on behalf of the entity that provides the personalized script for a caller. Other forms of information may also be monitored, such as arrest records, credit records, and news sources etc.

Although not detailed thoroughly, the SIP enrichment sub-system 420 may provide contextual information directly to the contact context manager 440. In this case, the information provided by the SIP enrichment sub-system 420 may be supplemental to the information provided in the session initiation protocol message, or may be alternative to providing the contextual information in the session initiation protocol message.

As noted previously, the header of a session initiation protocol message may be provided with a Boolean or other form of code to point the contact context manager to the session initiation protocol message body for contextual information. The contextual information may then be embedded in the message body, or may be pointed to yet another location via a uniform resource locator or other type of communication address that points to a location from which the contact context manager 440 can retrieve all contextual information, either one time or continuously.

The situational-aware IVR 430 explained in detail with respect to FIG. 4 may be a carrier-class IVR system that enables the deployment of a wide range of intelligent IVRs. The situational-aware IVR 430 may use contextual data to improve customer experiences and reduce call volumes to call centers. Situational awareness generally refers to the collection and use of information relevant to an IVR caller interaction, including information identified before the interaction begins. The relevant contextual information is used to select, modify, update, or otherwise enrich the content and flow of an interaction to improve the quality and duration of the interaction. Therefore, the situational-aware IVR 430 is generally representative of an IVR that knows what's going on with and around a caller.

The situational-aware IVR 430 may support standard IVR functions and can be integrated with external information systems using APIs, as noted with respect to several embodiments herein. The situational-aware IVR 430 enables the creation also of customized self-service functions like payment and balance inquiries, services activation or deactivation, subscriber service problem management, notifications, and other self-service functions. The situational-aware IVR 430 may be enabled by obtaining, identifying and using relevant contextual information via a rule-based menu structure based on the needs of each self-service function.

As another example of how a situational-aware IVR 430 may work, a grocery store or other establishment may include a pharmacy that dispenses prescription medications. A particular caller to a number for the pharmacy may always or usually call for refills for a particular medication. The particular caller may always or usually call from the same smart phone. The particular caller may always or usually provide the same call-back number. In this example, when the situational-aware IVR 430 recognizes a call from the particular caller, the situational-aware IVR 430 may be informed that a particular prescription is due for a refill soon. Accordingly, a script may be modified to ask the caller as the first item whether the caller is calling to request a refill for a particular prescription due to be refilled. If the caller responds in the affirmative, all of the other necessary information may be presented to the user and the user may be asked to simply state whether any of the other information is incorrect. In this way, a caller's processing time may be greatly reduced in comparison to what the caller previously experiences.

Additionally, as is known, session initiation protocol messages that can be used herein are not limited to an initial INVITE message, but can also be acknowledgement (ACK) messages, OK messages, BYE messages, or any of the other various functional messages that are known. Such session initiation protocol messages may be used both to send messages from a user device, and to send messages to a user device. Any such session initiation protocol message should have a header into which supplemental enhancement information can be inserted for extraction by the recipient.

As described above, a contact context manager 440 captures important customer information from both internal and external sources to generate a contextual active record for the customer. This data will be used to improve the quality of customer interaction. A contact context manager 440 can also communicate with an enterprise contact center's back-end business processes to enable the caller to conduct various important functions in a self-service mode.

The contact context manager 440 includes a contact context manager data interface 441 that receives data from a telecommunication VoIP carrier and contacts center internal databases. Additionally, a contact context manager database 443 contains relevant customer data including context data. A contact context manger information filter/enhancer 448 has two functions, i.e., to filter irrelevant data to generate a contextual active record, and to update and enhance contextual active record parameters based on inquiries from an IVR rules engine 436. Updates and enhancements may be based on new information received from customer IVR interactions that cause the IVR rules engine 436 to ask for more customer data.

A contextual active record generator 445 generates a contextual active record to forward to the situational-aware IVR 430. Such a contextual active record includes a set of parameter determined relevant to the caller and the particular call. Such a contextual active record may be dynamically identified based on the receipt of the session initiation protocol message and the following call. Parameters of a contextual active record may be updated based on new data received from a network and/or a customer. As described herein, however, a contextual active record can be first established before a caller ever communicates over a network with an entity, such as when the caller first establishes an account at a retail location. The contextual active record can also be updated based on new information available about the caller, before the caller ever calls or between calls from the caller.

A contextual active record may contain important contextual data to be provided to a situational-aware IVR, such as the situational-aware IVR 430. A contextual active record may be generated initially independent of a caller attempting to contact the call center, such as when a customer first enrolls for service or makes a purchase from a company that provides the situational-aware IVR 430. The contextual active record may be saved in the contact context manager. The contextual active record can be updated upon receiving information from the interactions between the situational-aware IVR 430 and the customer/caller.

A contextual active record can include major events (MEs), including major outages, unresolved issues, pending orders, previous unresolved billing issues, and weather related problems. Major events can be used as important context data to understand if the call is related to any of these or other types of important events. A contextual active record may also include contextual active record parameters. A contextual active record is parameterized based on important contextual data. Some parameters can be updated when new information is received from the interactions.

A contextual active record can also include social/partnering company parameters. These kinds of parameters can be provided from accessible third party interactions, and may be obtained when a user selects an option-in choice for enabling access to the contextual data collaboration. In such a case, a contextual active record can include a social network profile, preferences, and behavior clues, such as information that can be obtained from an online social network with permission from the caller. Partner companies may also include third-party data collection companies that compile profiles from many sources, such as from credit card companies that track purchases or credit events, social network companies that track social network usage, criminal history investigation companies that maintain databases of criminal record information, government databases that reflect information such as home ownership, marital status and tax compliance. Third-party data collection companies may maintain profiles of users as a business, and make the profiles available on demand for a fee or as part of a subscription service. Therefore, a contact context manager may even selectively determine when to request a profile from a third party service that maintains profiles, such as when the contact context manager recognizes that the caller is a new customer for which little information is otherwise available. A third party profile is then used to generate or update a contextual active record maintained by an entity as described herein.

A contextual active record may also include location and related parameters, including a current location and location history, location environmental information such as temperature, noise level, motion, and available/unavailable channels for communications. Environmental information may also include information such as snow and rain amounts that have occurred, are occurring, or are expected to occur. Location information may be strict longitude, latitude and GPS information, or may also include political location information such as names of places such as towns, cities, neighborhoods, school districts, church/parish areas, and so on.

The contact context manager IVR interface server 446 is responsible for sending and receiving data in real time to and from the situational-aware IVR 430. The contact context manager IVR interface server 446 can communicate directly with the situational-aware IVR 430 to send context data and to receive inquires for new context data or update.

Figure 5:
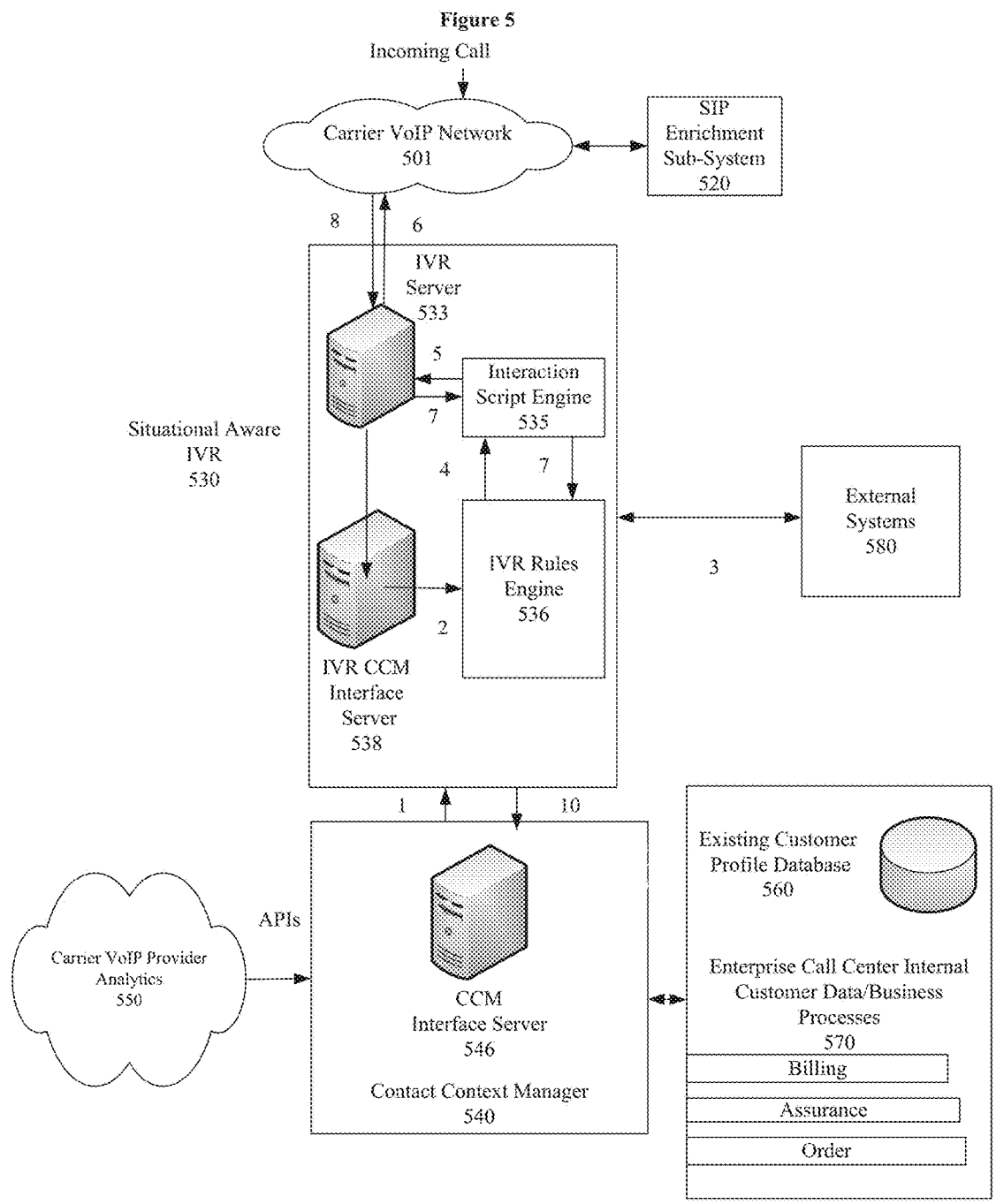
FIG. 5 shows another exemplary network for active records for interactive systems, according to an aspect of the present disclosure.

FIG. 5 shows another exemplary network for active records for interactive systems, according to an aspect of the present disclosure. As shown in FIG. 5, an incoming session initiation protocol message is carried across the carrier VoIP network 501, intercepted by the SIP enrichment sub-system 520, enriched and then returned to the carrier VoIP network 501. The enriched SIP message is then transmitted to the situational-aware IVR 530. In FIG. 5, the situational-aware IVR 530 includes an IVR server 533, an IVR CCM (Contact Context Manager) interface server 538, an interaction script engine 535, and an IVR rules engine 536. The situational-aware IVR 530 obtains contextual information from external systems 580. Additionally, the situational-aware IVR 530 interacts with contact context manager 540, which in turn receives APIs from carrier VoIP provider analytics 550. The situational-aware IVR 530 also interacts with existing customer profile database 560 and enterprise call center internal customer data/business processes 570. The contact context manager 540 includes a CCM interface server 546 for interacting with the situational-aware IVR 530.

In FIG. 5, contextual data is received from an enriched session initiation protocol message by the situational-aware IVR 530. A telecommunication company's VoIP network 501 can deliver the enriched session initiation protocol message to the IVR server 533. The contextual information in the session initiation protocol message header is extracted by the IVR server 533 to be used in caller interaction. Additionally, names and/or numbers in the session initiation protocol message can be forwarded to the CCM interface server 546 of the contact context manager 540 via the IVR CCM interface server 538. The names and/or numbers or other identifying information can be used to retrieve a contextual active record for the caller from the CCM interface server 546. The IVR CCM interface server 538 can then request that the contact context manager 540 provide a complete contextual active record on the caller. In this way, even based caller identification information can be used to retrieve a complete contextual active record for a caller.

In FIG. 5, contextual data is also received as a contextual active record directly from a contact context manager 540. A contextual active record is forwarded to the IVR CCM interface server 538 upon request from situational-aware IVR 530. If there is no existing contextual active record for the customer, the contact context manager 540 may generate a new contextual active record from available information. The IVR rules engine 536 receives the contextual active record to be used to invoke a rule to a) prioritize important context attributes in a contextual active record, and/or b) provide instructions to differentiate the treatment of a customer. Examples of instructions for differentiated treatment would be how to deal with customers with numerous contacts history or how to deal with an annoyed customer.

Based on information received from the caller during IVR interaction, the IVR rules engine 536 may request data from a backend business process system, such as the assurance, billing, provisioning or order processes shown for enterprise call center internal customer data/business processes 570. While waiting for a response, the IVR rules engine 536 can provide "relevant" contextual data and script decisions to the interaction script engine 535. The interaction script engine 535 can then formulate an initial response for use by the IVR server 533 to interact initially with the customer. The IVR server 533 can play a greeting set by the communication script selected for the caller. Once the caller identification is completed, the interaction script engine 535 can formulate additional responses to provide to the IVR server 533 with updates from the IVR rules engine 536. The IVR server 533 then plays interactive communication scripts for the caller, and then gets additional/updated contextual data based on additional information provided by the customer.

In FIG. 5, the situational-aware IVR 530 can be sure if the caller matches a contextual record. In this way, the situational-aware IVR 530 can obtain voice biometrics, passwords, birthdays, names, personal identification information, caller identification information, or other forms of data to authenticate a caller and try to ensure that privacy information is not released incidentally to other parties.

In FIG. 5, the IVR server 533 conducts smart IVR caller interaction using the interaction script engine 535. The interaction script engine offers static scripts or dynamically-selected and/or dynamically-updated scripts to the IVR server 533 based on directions and data from the IVR rules engine 536. The IVR rules engine 536 will receive, with or without requesting, contextual dataset from the contact context manager 540 via the IVR CCM interface server 538.

The IVR rules engine 536 will also fetch account related information from downstream systems when needed. The contextual dataset coupled with any instructions from the caller and data fetched from downstream systems will allow the IVR rules engine 536 to direct the interaction script engine 535 play static scripts or dynamically selected/altered scripts.

As described in FIG. 5, the IVR CCM interface server 538 will receive contextual data from the contact context manager and pass the contextual data to the rules engine 536, so that ultimately the contextual data is used to select and/or update a script.

As described, the systems in FIGS. 3-5 may include a situational-aware IVR 330, 430, 530 that receives a session initiation protocol message enriched by a SIP enrichment sub-system 320, 420, 520. Immediately afterwards, a situational-aware IVR 330, 430, 530 can send a real time request to a contact context manager 340, 440 540 for a contextual active record. The contextual active record may be a record composed only of data internal to a service provider, such as a record from purchases, complaints, call records, etc. Alternatively, the contextual active record may include other information derived from external sources.

Also as described, a carrier VoIP provider analytics 350, 450, 550 can be used by a communication carrier to provide a rich library of contextual and customer data APIs. Parts of the contextual record provided from analytics can be obtained from Big Data, such as targeted advertisements that may be presented to the user while the user is on hold or waiting for interactions to start or continue.

Additionally, though embodiments described herein mainly describe a one-time retrieval of context information, some context information may be continually updated and received from a user device, such as when a user is using a mobile device in a crowded urban area or in a fast moving car. In this way, the situational-aware IVRs 330, 430, 530 can receive updated information from the user's device via additional session initiation protocol messages from SIP enrichment sub-systems 320, 420, 520. Of course, the updated information from the user's device may be sent to the contact context manager 340, 440, 540 instead of the situational-aware IVRs 330, 430, 530, such as when the contact context manager 340, 440, 540 will check the updated information for relevance and only provide the updated information for use in updating a script when the updated information is relevant to the call. Indeed, when the updated information is not particularly relevant, the contact context manager 340, 440, 540 or the situational-aware IVRs 330, 430, 530 may send a message back to the user device instructing the user device that no further updates are particularly warranted.

Figure 6:
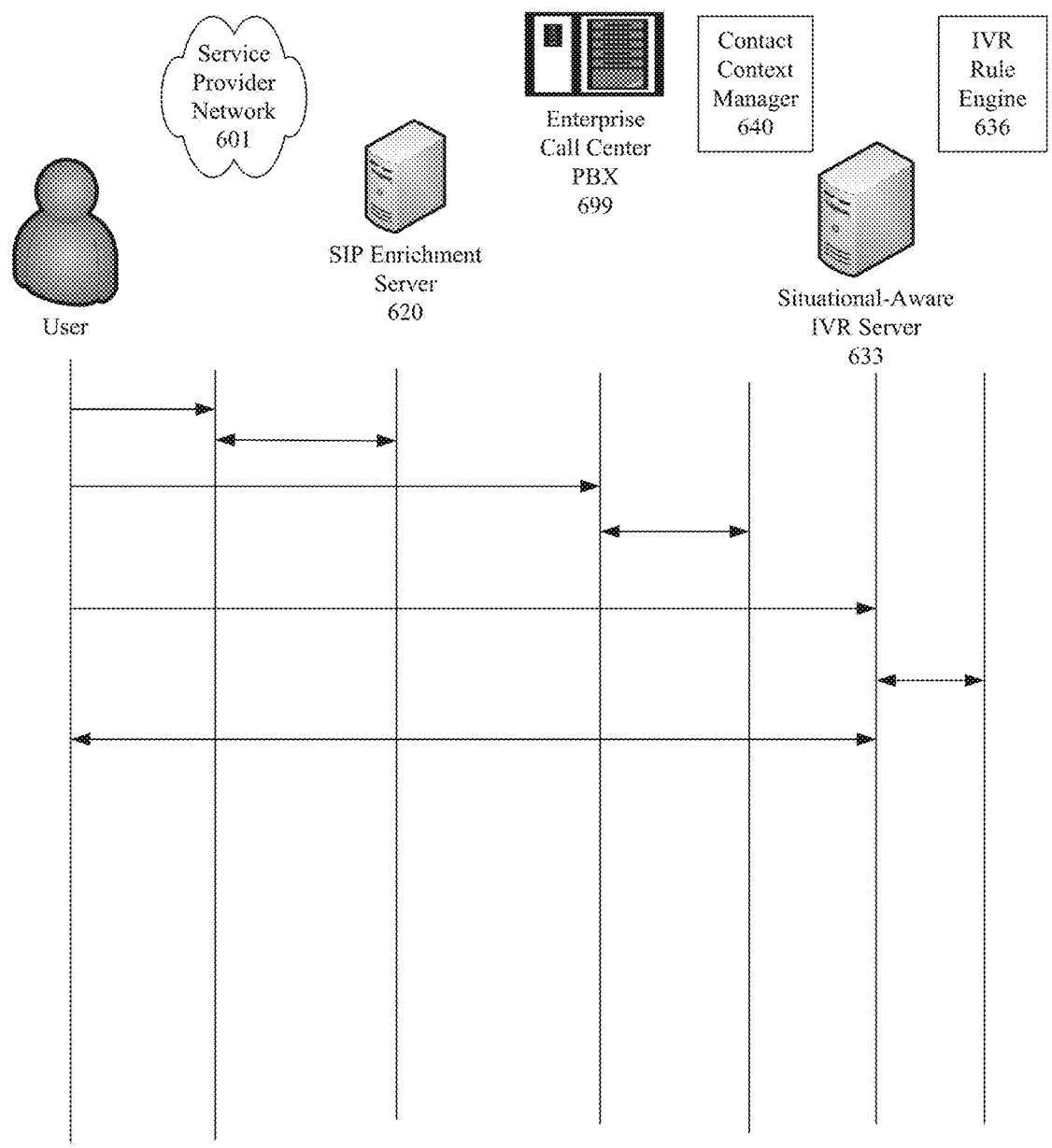
FIG. 6 shows an exemplary communication flow for active records for interactive systems, according to an aspect of the present disclosure.

FIG. 6 shows an exemplary communication flow for active records for interactive systems, according to an aspect of the present disclosure. In FIG. 6, a session initiation protocol message is sent from a user device to and through a service provider network 601. Ultimately the session initiation protocol message is sent to the SIP enrichment server 620, and a call is set up so that the call can be made between the user and the enterprise call center PBX 699. The enterprise call center PBX 699 requests context information and instructions from the contact context manager 640 while the enterprise call center PBX 699 is holding the call before sending the call to the situational-aware IVR server 633. Once proper context information is obtained, the information is provided to the enterprise call center PBX 699. The call is then transferred from the enterprise call center PBX 699 to the situational-aware IVR server 633, which refers to IVR rule engine 636 in order to obtain instructions for a script to select or update based on the contextual information provided to the contact context manager 640. The call is continued and completed between the user and the situational-aware IVR server 633 based on the contextual information provided via the SIP enrichment server 620 and any selected and/or modified script that is selected and/or modified based on the IVR rule engine 636.

A situational-aware IVR 530 as shown in FIG. 5 includes and provides both conventional and modified features. Thus, the situational-aware IVR servers described herein, including the situational-aware IVR server 633 in FIG. 6, can use call processing logic that defines how a call is processed by the situational-aware IVRs (e.g., situational-aware IVR 530 in FIG. 5). The call processing logic is defined in the form of a hierarchical decision tree and a set of rules that guides the navigation of the tree and IVR/caller interaction. The remaining filtered subset of the contextual active record may include, for example, a called party number and a calling party number or other types of communication address identifiers. The remaining filtered subset of the contextual active record can be used to start the interaction process, and may include authentication interactions and greeting interactions.

An initial (root) menu item can be selected for the particular incoming call according to the called party number and the calling party number. The initial (root) menu item may be a set of selections to present to the caller, and may be selected for initial presentation based on the contextual active record. The situational-aware IVRs described herein can start addressing the first major event in the customer domain. Examples of a major event that may be prioritized include a previous technical issue, a major outage in a subscriber's area, or a latest billing dispute reported by the customer. These possibilities may be presented to the caller in a single continuous presentation at a menu node, or may be presented to the caller sequentially in different nodes. The caller can then be asked by the situational-aware IVRs if the call is related to any of these major events.

Subsequent processing of the incoming call can be defined as the sequence of steps between the nodes of the decision tree based on information entered by the subscriber allowing the subscriber to navigate. Subsequent interaction may depend on the service being accessed. For example when an account balance inquiry from is processed, the subscriber may already have been authenticated to access balance information. If the subscriber accesses the service from the subscriber's own phone, the balance information can be retrieved from a billing database and transferred to the subscriber as data automatically without any additional action from the subscriber.

Figure 7:
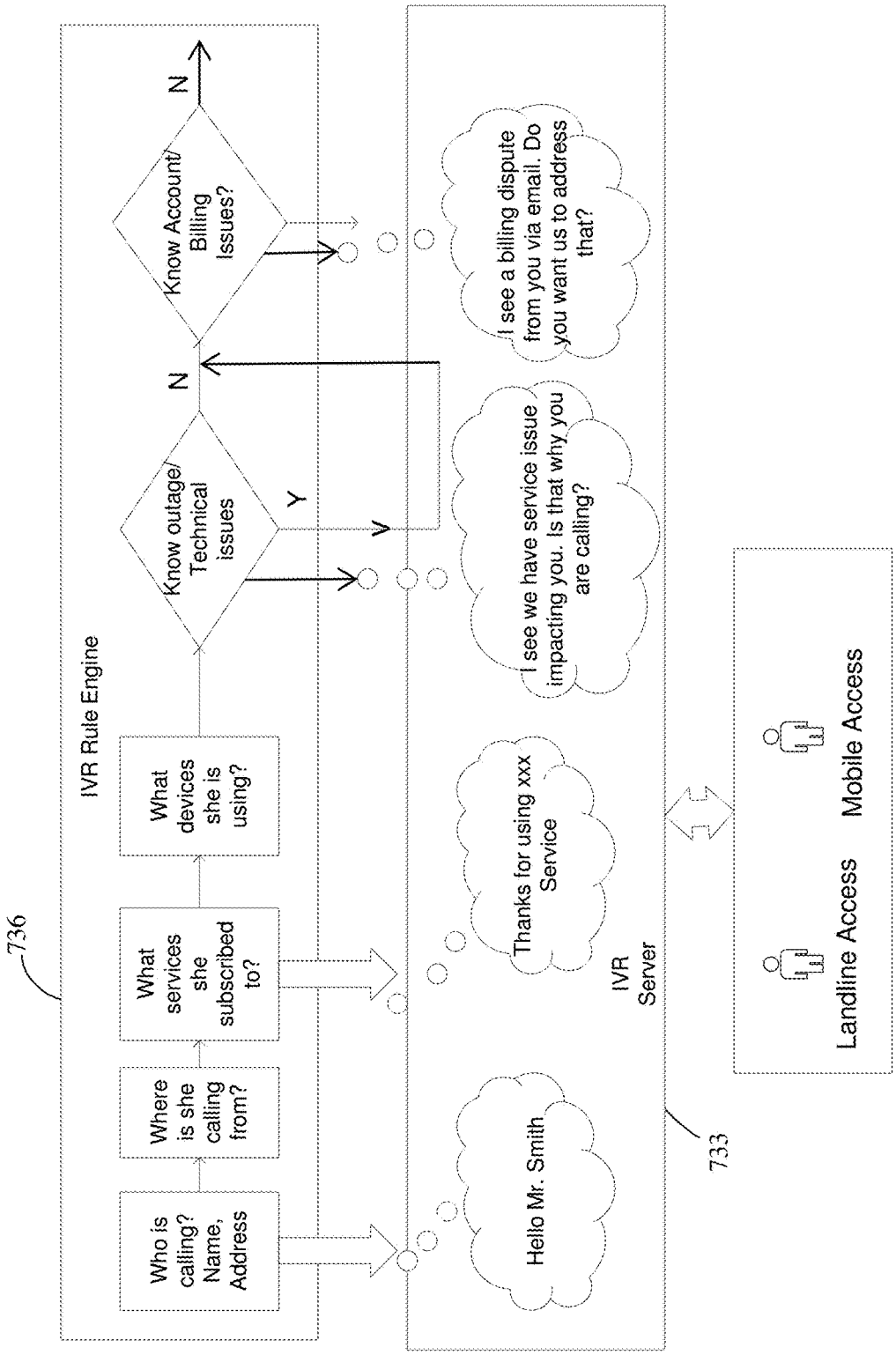
FIG. 7 shows an exemplary system for active records for interactive systems, according to an aspect of the present disclosure.

FIG. 7 shows an exemplary system for active records for interactive systems, according to an aspect of the present disclosure. In FIG. 7, an IVR rule engine 736 processes a set of contextual information to assist the IVR server 733 in interacting with the user. For example, an introduction of "Hello Mr. Smith" may be provided by the IVR server 733 based on known retrievable contextual information that indicates the caller's name and address.

As noted previously, an initial contextual record can be retrieved based on a calling party telephone number. The contextual record may include some information which is not particularly used, such as "where is the caller calling from". Individual prompts may be selected or modified based on information in the contextual record. For example, a default prompt in a script may be "thank you for using our service", whereas contextual information indicating a particular service may allow modification of the default prompt to specify "thank you for using" a particular identified service. Context information may also come from general information that applies to multiple customers/subscribers, such a geographical service outage in multiple areas. A check of the subscriber's location or account number may be used to compare the subscriber's information against known outages, and a prompt may be selected to ask the caller if the caller is calling about a particular known outage. As noted, the particular prompt may be selected and presented based on a determination of the most likely reasons a caller is calling, or based on other information from a contextual active record used in a dynamic determination.

In FIG. 7, each identification of a potential reason for the call may result in a different prompt being selected and presented to the caller. Indeed, potential reasons may be assigned probabilities using predetermined formulas, such as formulas that weight the likely importance of different types of contextual information to a caller. A potential reason for a call with the highest probability may be presented to the caller first in a personalized interactive script. Alternatively, more than one but less than all identifications may result in a prompt being selected and presented to the caller. As shown in FIG. 7, specific determinations based on service provider contextual information may include checks for outages, technical issues, or customer-specific account or billing issues. Identification of any particular issues from the service provider's contextual information records may result in a corresponding prompt being selected and presented. In FIG. 7, such prompts include "I see we have a service issue impacting you. Is that why you are calling?" and "I see a billing dispute from you via email. Do you want us to address that?". As shown in FIG. 7, responses to particular questions presented as prompts may result in which particular prompt is played subsequently to a caller. Thus, when a caller responds "no" to the outage/technical issues question, the next prompt may be played without addressing the known outage or technical issues any further.

In FIG. 7, the prompts that are actually selected and presented are presented by the IVR server 733. As is known conventionally, the IVR server 733 may complete a call by providing all requested information to the caller, or the IVR server 733 may transfer a call to a human agent. When a call is transferred, information from the interactions between the user and the IVR server 733 may also be provided to the human agent. The interaction information may include a decision tree graphic with information for each node that has already been navigated and answered. Therefore, a human agent may pick up in a script where an IVR server 733 leaves off. Additionally, as shown on the bottom of FIG. 7, the IVR server 733 may communicate with landline callers or mobile/wireless callers. Devices used by a caller to communicate with an IVR server 733 are of course not limited to traditional telephony devices (phones), but may also include desktops and laptops, and interactive internet-enabled televisions.

Figure 8:
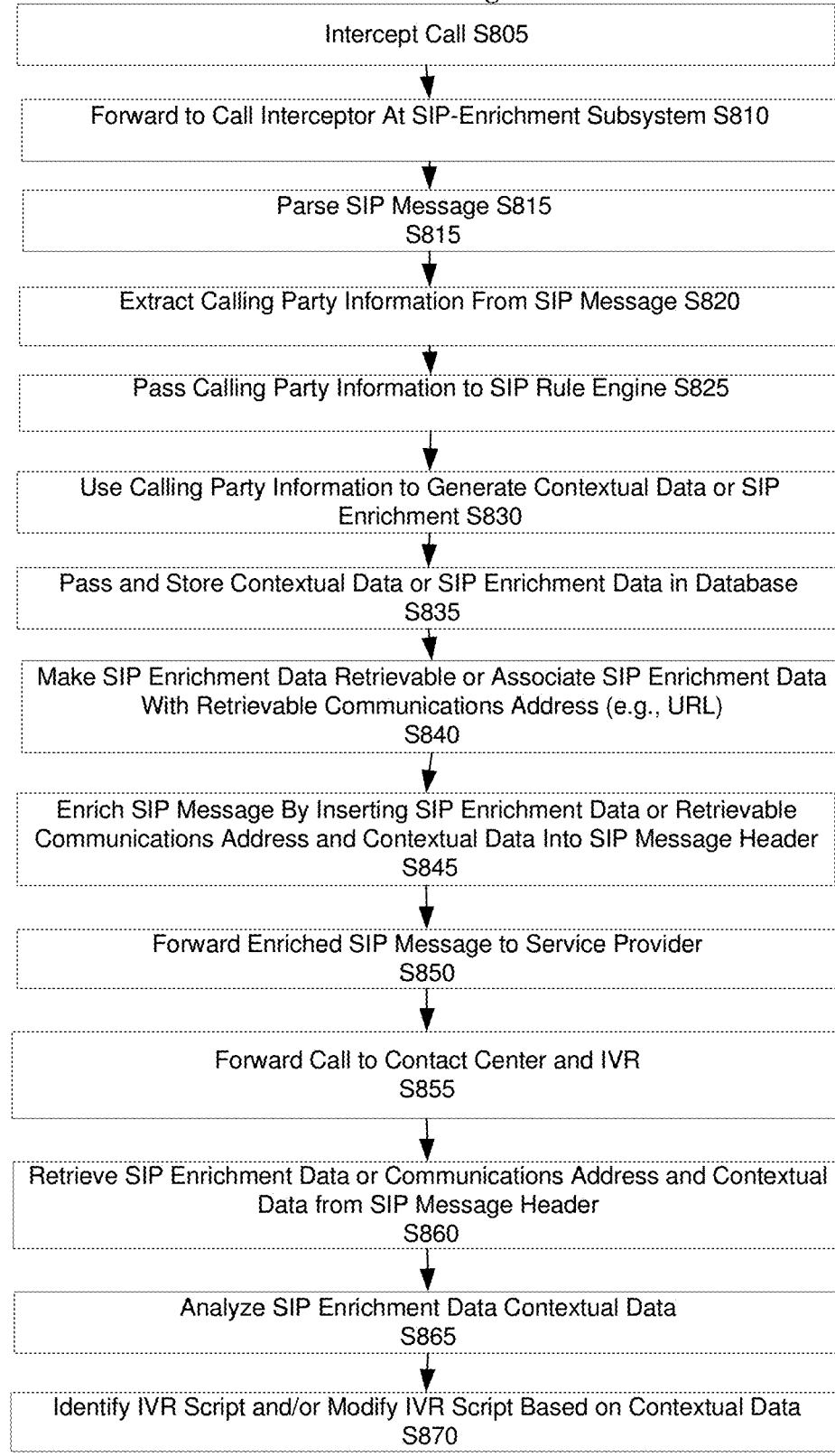
FIG. 8 shows an exemplary process for active records for interactive systems, according to an aspect of the present disclosure.

FIG. 8 shows an exemplary process for active records for interactive systems, according to an aspect of the present disclosure. At S805, a call is intercepted. At S810, the session initiation protocol message for the call is forwarded to a call interceptor at the session initiation protocol-Enrichment Subsystem. The session initiation protocol message is parsed at S815. Calling party information is extracted from the session initiation protocol message at S820. The calling party information is passed to the session initiation protocol rule engine at S825. The calling party information is used to generate contextual data for session initiation protocol Enrichment S830. Contextual data is passed and stored for session initiation protocol enrichment data in a database at S835. The session initiation protocol enrichment data is made retrievable or associated with a retrievable communication address (e.g., URL) at S840. The session initiation protocol message is enriched by inserting the session initiation protocol enrichment data or the retrievable communication address and contextual data into the session initiation protocol message header at S845. The enriched session initiation protocol message is forwarded to a service provider at S850. The call is forwarded to a contact center and IVR at S855. The session initiation protocol enrichment data or the communication address and contextual data are retrieved from the session initiation protocol message header at S860. Although not shown, if a retrievable communication address is provided in the header, a request to obtain the information from the retrievable communication address may be sent in order to retrieve the enrichment data or contextual data. The session initiation protocol enrichment data or contextual data in the header is analyzed at S865. At S870, an IVR script is identified and/or modified cased on the session initiation protocol enrichment data or contextual data.

Figure 9:
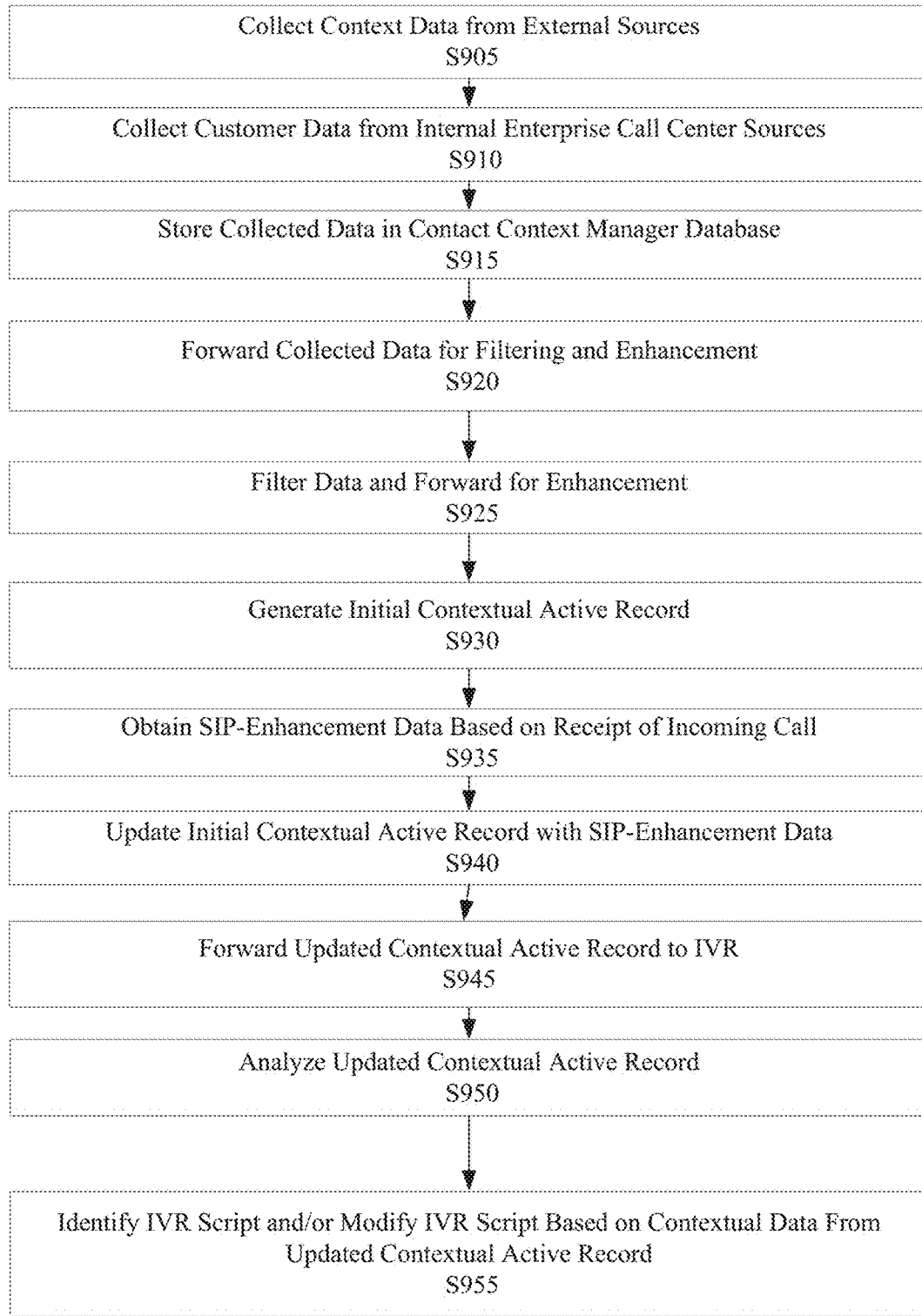
FIG. 9 shows another exemplary process for active records for interactive systems, according to an aspect of the present disclosure.

FIG. 9 shows another exemplary process for active records for interactive systems, according to an aspect of the present disclosure. As described, in FIG. 9 a contact context manager generate an initial contextual active record based on existing customer data and an customer profile in an enterprise call center database. The contact context manager may also receive additional customer contextual data from external sources. An example of receiving additional customer contextual information is receiving customer data from a telecommunication service provider, such as telecommunication VoIP service provider.

A contact context manager in FIG. 9 collects and processes explicit and derived contextual data, and generates the initial contextual active record (CR). The contact context manager collects and processes all customer contextual data and can generate a contextual active record for every customer associated with an enterprise call center. The initial contextual active record will be created and stored in contextual active record generator sub-system. Whenever a caller contacts a call center, the caller's identification is derived from a session initiation protocol message and sent to the contact context manager to obtain the customer contextual active record. The process of obtaining the contextual active record is described next.

At S905, context data is collected from external sources. External sources can include a telecommunication VoIP service provider's big data analytic APIs, as well as context data from other sources such as social networks, weather sources, search engines, and data sources that provide personal data to companies as a service for a fee.

At S910, customer data from an internal enterprise call center source is collected. Such customer data can include customer profile data, contact history, subscriptions, purchases, complaints, authorized users, usage history such as for a wireless carrier, and historical data of how a customer is provided service by a service provider.

The collected data is stored in a contact context manager database at S915, and at S920 the contact context manager database forwards the data for filtering or the data is retrieved from the contact context manager database. The contact context manager then filters irrelevant data and forwards retained data for enhancement at S925. At S930, an initial contextual active record for the customer is generated at S930.

As noted, an initial contextual active record may be later updated based on session initiation protocol message enriched data. For example, a caller using a device belonging to another party may initially have a contextual active record retrieved that belongs to the other party. In such a circumstance, the contextual active record should be updated in order to provide proper services to the party who is borrowing the device from another party. The contextual active record can be updated based on information from the caller directly. Similar to the manner in which individuals can provide a phone number to a clerk at some retail establishments, a phone number or other form of personal account identifier can be provided by an individual at the beginning of a call in order for the individual to obtain the benefit of the contact context enhancements described herein. Callers or website visitors may even be asked explicitly at the beginning of a communication if they would like to provide a phone number or other identifier associated with them personally or with a particular account. In an embodiment, a caller or website visitor may be provided the option to provide the alternative identifier before an interactive session begins.

One way in which the session initiation protocol message can be modified according to the present disclosure is to provide a mechanism to indicate that the caller's context information corresponds to another telephone number or other communication address or unique identifier. A phone switch or router can be modified to parse input called numbers so that information provided after a pound sign is accepted as an alternative number belonging to the caller, or another originating address or other unique identifier. An example in VoIP would be if a number 8008666666 is registered in a database as a dialed number to be intercepted. When a particular user corresponding to a first contextual active record calls from a communication device associated with a different user and different contextual active record, the particular user can dial 8008666666#(alternative number), such as 8008666666#5104312222. Here, the last ten digits after the pound (#) sign could indicate the particular user's actual telephone number or other originating address or other unique identifier. The session initiation protocol infrastructure can then parse strings without truncation, and the SIP interceptor can use the last 10 digits to retrieve the contextual active record corresponding to the 10 digits after the pound sign. That is, the phone switch or router or equivalent can be modified to use the characters after the pound sign to identify a contextual active record for a caller. Further, if the particular user is using a computer to enter the 8006666666 for a VoIP call, the user may have the liberty to enter anything after the # which includes but is not limited to an account number such as AC93456, an IP address such as 123.12.12.123, a phone number, etc.

The contextual active record generator then waits for a request from the situational-aware IVR to forward the contextual active record to the situational-aware IVR via an IVR interface upon receiving a request from the situational-aware IVR. When an incoming session initiation protocol message is received, the session initiation protocol message provides context data to be delivered to the contact context manager IVR interface Serve at S935. The contextual active record is then forwarded to the contact context manager.

The existing contextual active record is updated with the session initiation protocol message information enhancement data at S940, and the updated contextual active record is forwarded to the situational-aware IVR at S945 for use in caller interaction. If there is no existing contextual active record for the customer, the contact context manager will create a contextual active record with the session initiation protocol message provided data for the caller, and the situational-aware IVR will be informed. As noted previously, the session initiation protocol message enhancement data may be a URL, in which case the URL may point to a web address that shows a most recent caller location and environment. In any event, the session initiation protocol message enhancement data will be incorporated to the contextual active record.

At S950, the updated contextual active record is analyzed, and at S955, a script will be selected and/or modified based on the updated contextual active record analyzed at S950. Services are then provided in accordance with the selected and/or modified script.

Figure 10:
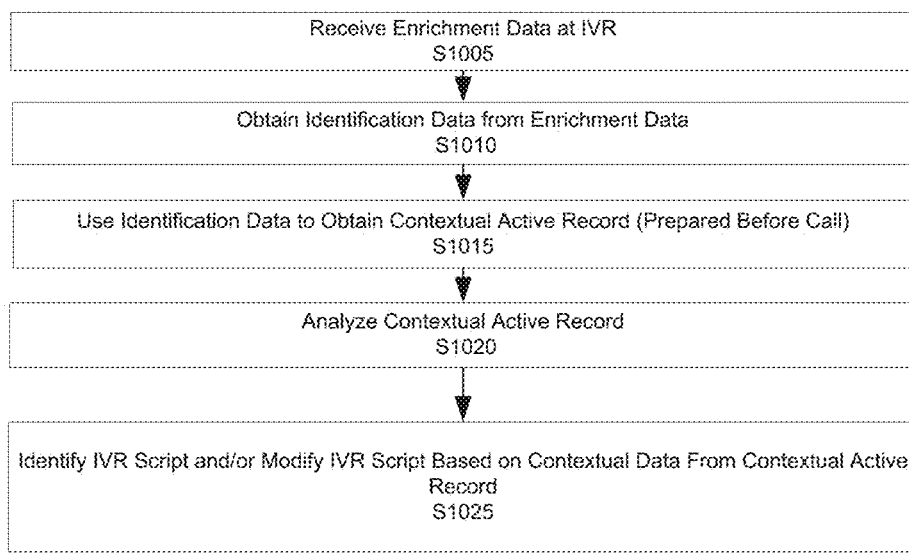
FIG. 10 shows another exemplary process for active records for interactive systems, according to an aspect of the present disclosure.

FIG. 10 shows another exemplary process for active records for interactive systems, according to an aspect of the present disclosure. In FIG. 10, enrichment data is received at an IVR at S1005. At S1010, identification data is obtained from the enrichment data. At S1015, the identification data is used to obtain a contextual active record. The contextual active record at S1015 is an existing record prepared for the customer before the call was ever received. At S1020, the contextual active record is analyzed, and at S1025 an IVR script is identified and/or modified based on contextual data from the contextual active record. FIG. 10 thus serves as an overview of the operations of a situational-aware IVR described herein.

Figure 11:
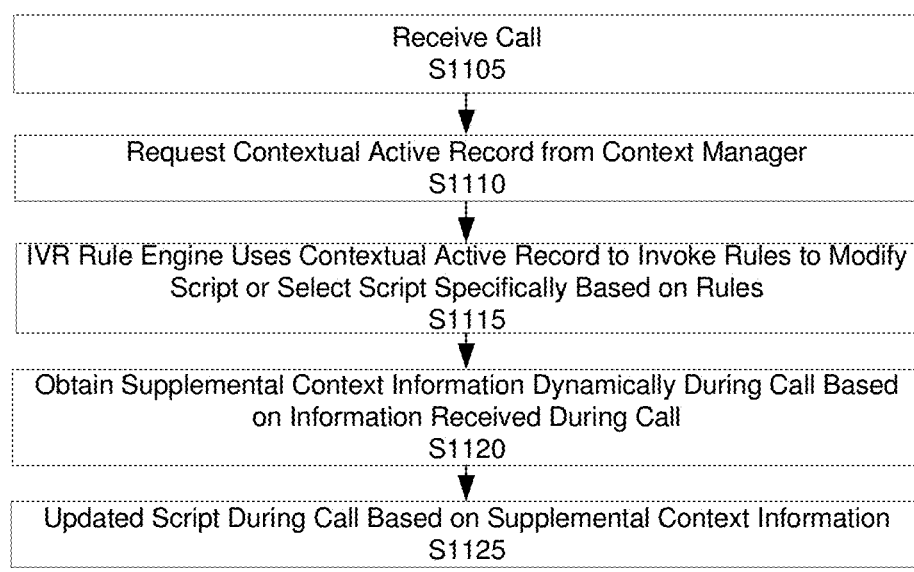
FIG. 11 shows another exemplary process for active records for interactive systems, according to an aspect of the present disclosure.

FIG. 11 shows another exemplary process for active records for interactive systems, according to an aspect of the present disclosure. In FIG. 11, a call is received at S1105, and a contextual active record is requested from a context manager at S1110. At S1115, an IVR rules engine uses the contextual active record to invoke rules to modify a script or select a script specifically based on preexisting rules used by the IVR rules engine for calls from different callers. The rules invoked by the IVR rules engine are not special rules used only for a caller; rather, treatment for a caller is customized based on how the rules are applied for the particular contextual active record corresponding to the caller. At S1120, supplemental context information is obtained dynamically during a call based on information received during the call, and at S1125 the script is updated during the call based on the supplemental context information obtained at S1120. Thus, in FIG. 11 context information that is information not directly obtained from interaction with the caller is obtained and used by a situational-aware IVR to modify the script already selected and being used to interact with the caller. As described herein, circumstances that would warrant updating a script already being used include when a caller is in a dense urban environment that is crowded with businesses or other people, or when a caller is moving in a car. The environmental information may include noise levels, information pertinent to the changing locations such as nearby food stores or safe places or open businesses or gas stations, or may simply be updated driving directions for how to get from one place to another.

Figure 12:
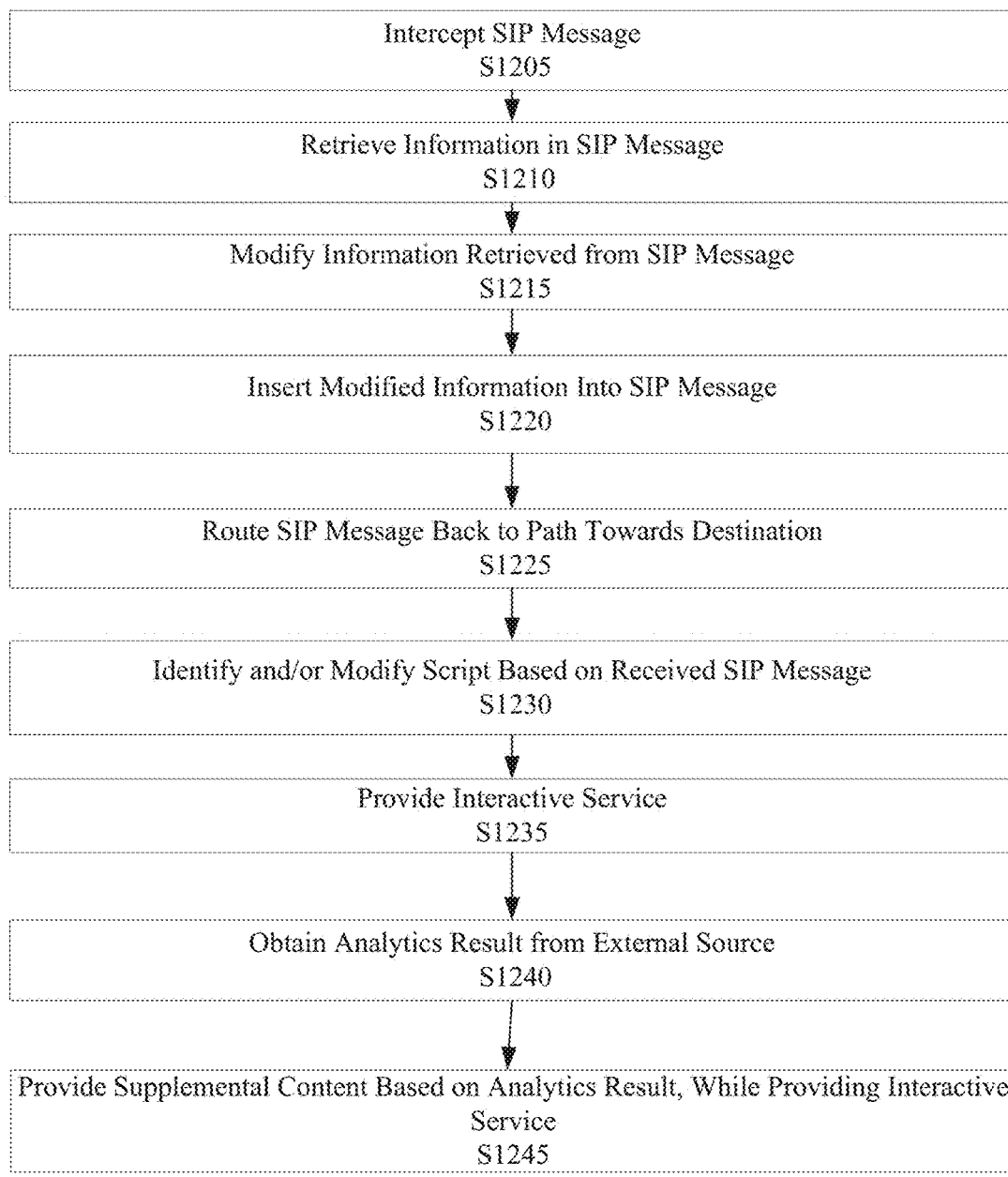
FIG. 12 shows another exemplary process for active records for interactive systems, according to an aspect of the present disclosure.

FIG. 12 shows another exemplary process for active records for interactive systems, according to an aspect of the present disclosure. In FIG. 12, a session initiation protocol message is received at S1205, information in the session initiation protocol message is retrieved at S1210, and the information retrieved from the session initiation protocol message is modified at S1215. As described herein, the actions performed at S1205, S1210 and S1215 are consistent with actions performed by a SIP enrichment sub-system 320, 420 or 520. Additionally, at S1220, the modified information is inserted into the session initiation protocol message, and at S1225 the modified (enriched) session initiation protocol message is routed back to the path towards its original destination.

At the destination, a script is identified and/or modified based on the received session initiation protocol message at S1230. An interactive service is provided at S1235. Analytics results are obtained from an external source at S1240, and supplemental content is provided to the caller based on the analytics results and while providing the interactive service.

In the embodiment of FIG. 12, the analytics results may suggest content such as advertisements or information to provide to the caller. For example, based on even just the contextual information provided in the initial session initiation protocol message, a location or gender of a caller can be quickly derived from many calling party numbers and customer names. This information can be used to match the call with content suggested based on analytics performed by, for example, a communication service provider, and the content can be played to the caller during pauses and holds in the call.

Further, although not illustrated, a contact center may also send content back to a calling device via a session initiation protocol message. For example, an executable instruction directing a calling device to a particular website may be provided back to the calling party device from the contact center. Thus, informational enrichment can be provided both ways in the manner described herein. The customer device can parse and retrieve any such executable instructions received in a session initiation protocol message from a contact center/situational-aware IVR.

The outbound session initiation protocol message can be used, for example, when a contact center needs to re-contact a customer such as to inform the customer that a complaint is resolved or help is on the way. If the customer is too busy or does not answer, a session initiation protocol message can be enriched so that a text or an SMS message is sent to the customer based on information in the enriched session initiation protocol message.

In another example, a notification may be sent back to a customer after an IVR/agent session is complete. The mechanisms for reporting include email, SMS, call back and so on. When the IVR/agent calls back, the IVR/agent can ask the SIP enrichment sub-system service to enrich a session initiation protocol message header/body with textual information. Therefore, when the call is received by the customer device, the embedded textual information can be extracted from the session initiation protocol message header/body. The extracted information may be, for example, a voice attachment.

A use for the situational-aware IVR may be for an existing customer who calls a contact center by either a landline or a mobile/cellular device. As described herein, the initial session initiation protocol message is enriched and routed to a PBX/ACD of an enterprise call center. The PBX/ACD then routes the call itself to the situational-aware IVR, which then uses session initiation protocol contextual data to identify and greet the customer. The situational aware IVR can also forward the contextual data to a contact context manager to retrieve an existing contextual active record, and the contact context manager will then incorporate the new session initiation protocol message context data into the existing contextual active record before returning the updated contextual active record back to the situational aware IVR. The IVR rules engine then invokes rules to determine the appropriate voice response to select and/or modify based on the updated contextual active record.

Figure 13:
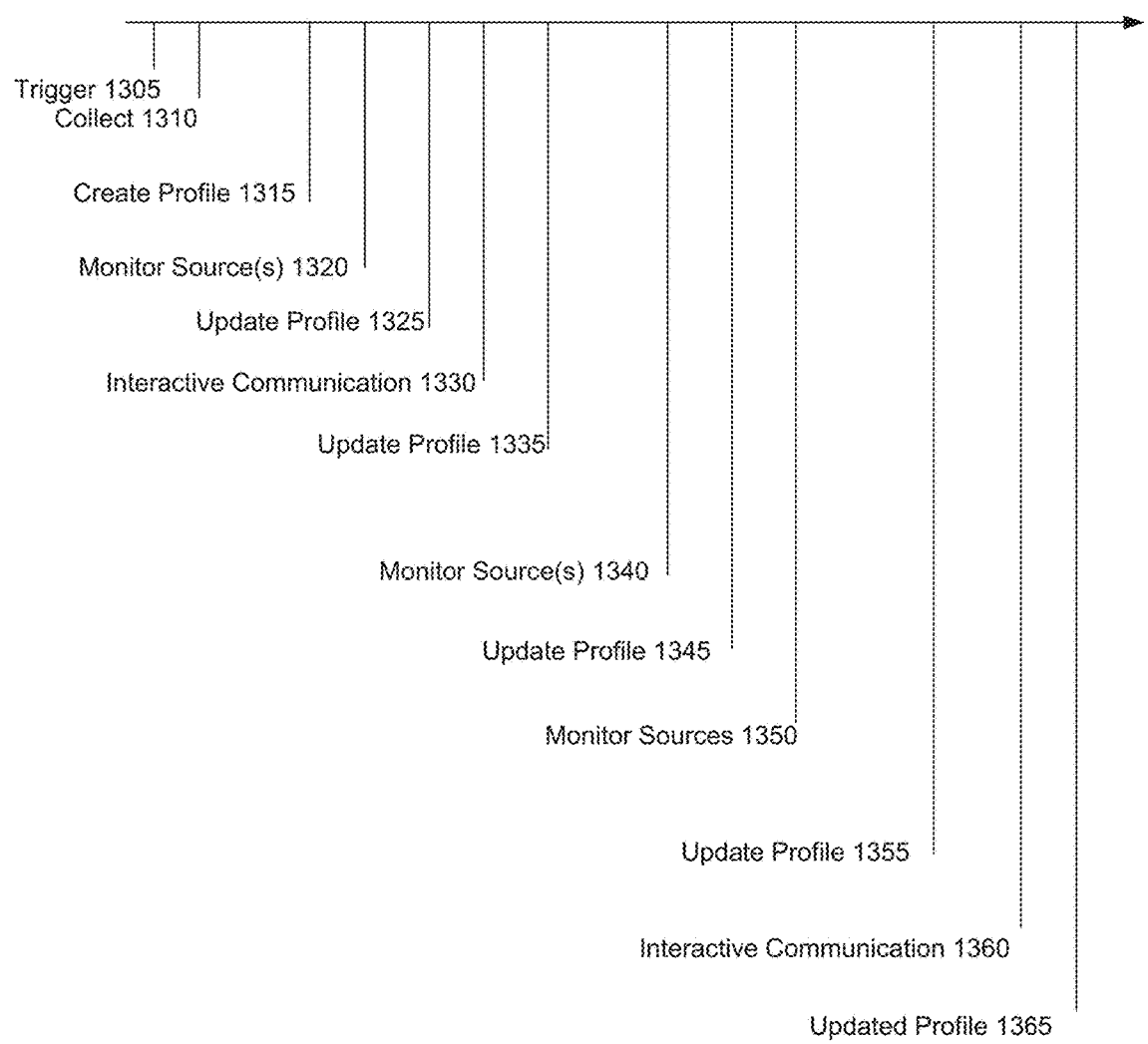
FIG. 13 shows an exemplary timeline for active records for interactive systems, according to an aspect of the present disclosure.

FIG. 13 shows an exemplary timeline for active records for interactive systems, according to an aspect of the present disclosure. In FIG. 13, the relative timeline begins with a trigger at 1305. A trigger may be a customer making a first purchase from a company, beginning a subscription with a company, establishing a relationship with a company, applying for credit with a company, joining a rewards program at a company, or any type of similar event that would make a company believe a customer may initiate interactive communications with the company in the future. The trigger may not involve a customer and a company, but may alternatively involve an employer and employee, a government agency and a citizen, a contributor and a non-profit entity, and so on, any of which would make an entity expect that a person may wish to initiate interactive communications in the future.

At 1310, the entity collects information from the person either directly or indirectly, and at 1315 the entity builds a profile for the person. An exemplary profile template is shown in FIG. 15, and profiles using such information can be stored in profile databases 260, 360, 460 and 560 in FIGS. 2-5. At 1320 sources are monitored. Sources may be social networks, private third party data suppliers or credit monitors or specialized websites and webpages, and so on. At 1325 a profile is updated, presumably based on information obtained based on and from a monitored website. At 1330 an interactive communication occurs, where the interaction by the entity is based at least in part on the profile for the person. In this way, the interactive communication is tailored for the person. As described herein, the interactive communication involves a context-aware IVR or similar interactive system.

At 1335 the profile is updated again. The profile may be updated to reflect the interactive communication that occurs at 1330, such as to reflect why the person initiated the communication, what the results of the interactive communication were, or information provided directly by the person in the interactive communication. At 1340 the sources are again monitored and at 1345 the profile is again updated, presumably based on information obtained from the monitoring. Although not required, the monitoring may be performed periodically rather than continuously, such as by checks once a day or once a week. At 1350 the sources are again monitored and at 1355 the profile is again updated, again presumably based on information obtained from the monitoring, though alternatively any updates herein could be provided based on information obtained from a means alternative to passively monitoring sources. At 1365 an interactive communication occurs, and at 1370 a profile is updated again.

In FIG. 13, the profile is specific to a person, and is used to personalize an interactive communication that occurs between a person and an entity. There are a variety of circumstances in which an entity may wish to provide a personalized interactive communication session with a person. Such circumstances include when a business expects particular customers or potential customers to warrant or require special treatment that may justify the business expending resources to perform monitoring of external data sources.

Alternatively, an entity may provide a third party service, wherein the entity reviews customer relationships and previous interactive communications between an entity and its customers, and identifies particular customers that may justify a special interactive communication script. An example may be a grocery store chain that includes pharmacy branches within the grocery store chain. A customer may call to re-obtain one or two prescriptions repeatedly over time, and encounter the same generic convoluted menu that specifies store hours, asks for phone numbers and prescription numbers, repeats the prescription information, and so on. However, a review of the calls may reveal that the customer may benefit from an initial question such as "press 1 to confirm you are" the customer and "press 2 if you are not", and then a follow-up question such as "press 1 if you are calling to refill" prescription X, "press 2 if you are calling to refill" prescription Y, and then follow up information confirming that the prescription will be refilled and when the prescription will be available. In this example, a review of repetitive interactive communications between a customer and an entity may reveal that a profile of the customer will benefit the entity by providing a basis for much shorter interactive communication sessions and a much more satisfied customer.

Figure 14:
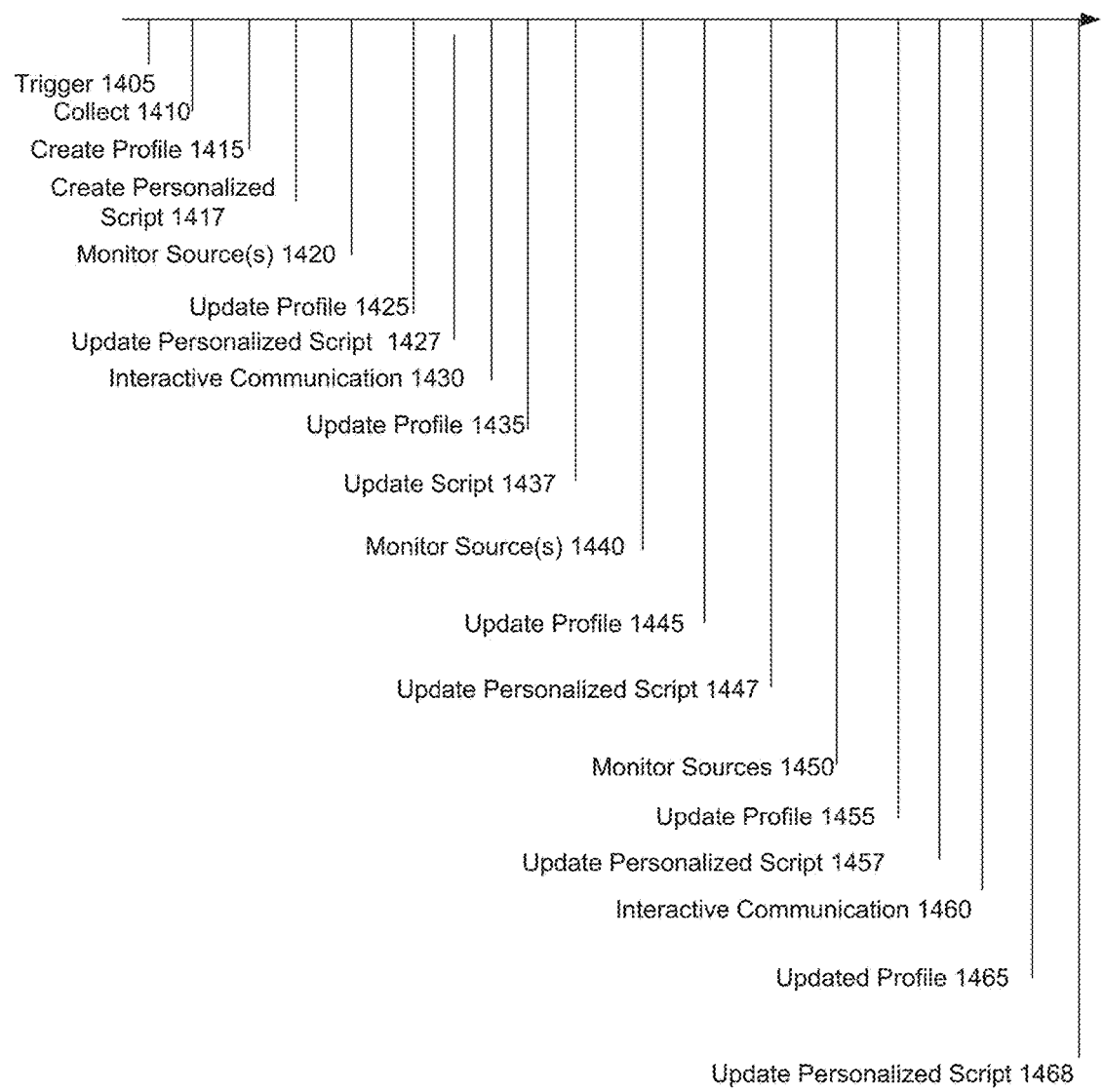
FIG. 14 shows another exemplary timeline for active records for interactive systems, according to an aspect of the present disclosure.

FIG. 14 shows another exemplary timeline for active records for interactive systems, according to an aspect of the present disclosure. In FIG. 14, the relative timeline again begins with a trigger at 1405. The trigger, collection, profile-building, monitoring, updating and interactive session in FIG. 14 are the same, similar or analogous to the corresponding functions described with respect to FIG. 13. Accordingly, descriptions of 1415, 1420, 1425, 1430, 1435, 1440, 1445, 1450, 1455, 1460, 1465 and 1470 are not repeated. However, in FIG. 14 a personalized interactive script is built at 1417, and updated at 1427, 1437, 1447 and 1457. Here, the personalized interactive script is a hierarchical script that governs how an IVR or other interactive system will communicate with a counterparty in an interactive communication. The personalized interactive script may be designed for communications with one specific person, even if only by presenting one special prompt as a first or second prompt in a communication session. Alternatively, a default script may be modified for a particular group of persons, such as those in a particular geographic location or those who subscribe to a particular service or purchase a particular item. In this way, the script is personalized for each person based on information particular to the person, even if the script is somehow otherwise the identical script provided for another person (e.g., another person in the same zip code).

The scripts modified for a group may also be personalized scripts for each person. As described with respect to FIG. 15 below, a characteristic code 1529 may be a form of code that can be used to identify contextual active records that should be updated. For example, if a person calls to report a power outage in a particular location, a utility company may update the personalized interactive scripts for each person served by the system in which the power outage is occurring. In this way, calls from people in the area may be consistently greeted with "if you are calling to report a power outage" in a particular neighborhood, "press 1". The contextual active records for the persons in the neighborhood may be identified by searching for characteristic codes 1529 that show information indicating the particular neighborhood by particular characters in particular placed in the characteristic codes 1529. For example, the code TF at the 12th and 13th character positions of a characteristic code may indicate that the contextual active record is for a person living in a neighborhood indicated by the code TF at the 12th and 13th character positions. In this way, a group of people may have active records identified and updated based on information used to update a first particular active record.

As described above, the active record is an active record that is maintained and updated for the person even when the person is not communicating with the entity that maintains the active record. In this way, an active record and personalized script can be prepared for a person before, after and between communication sessions. As a result, even entities that use contextual information can avoid scrambling to obtain contextual information at the time a communication is initiated, by preparing specially for incoming communications from particular persons before the communications occur.

FIG. 15 shows an exemplary profile template for active records for interactive systems, according to an aspect of the present disclosure. In FIG. 15, a variety of contextual information for a person is provided. The order in which areas of contextual information is shown may be rearranged in order to suit the needs of an entity for which the active record is built and maintained. Additionally, the areas shown are merely representative, and the information in different areas may overlap.

Area 1501 indicates a calling number, internet protocol (IP) address, or other communication address for a call. These addresses are merely representative of communications addresses from which communications from a person may be expected. As is known, a telephone number may be provided with a telephone call as caller identification information, and IP source information can be shown for incoming communications.

Area 1502 indicates a name of a person. The person may be listed along with aliases, nicknames, maiden names, or other indications of what the person wishes to be called.

Area 1503 indicates an account number. An account number may be a numeric number, alphanumeric number, or other form of account identifier that identifies an account particular to the person listed in area 1502. The account number or other account identifier may be meaningful only to the entity for which the contextual active record is maintained.

Area 1504 indicates an account level. An account level may indicate one level among several possible levels of customers or subscribers to an entity. A level may be, for example, "gold" for the perceived best customers, "silver" for the perceived next level of customers and so on.

Area 1505 indicates a marital status for a customer. Marital status may be married, single, divorced, widowed, engaged, and so on.

Area 1506 indicates dependent information. This area may list children, spouses, or other family members who can be considered dependent on a "main" account holder. This may indicate family members in a mobile telephony "family plan" by which multiple people are provided mobile telephony service by a single account in the name of a single responsible party.

Area 1507 indicates health information for an account holder. This information may be useful, for example, for a pharmacy that provides an IVR so that customers can order prescription refills. This information may also be useful for a medical equipment company that sells or rents medical equipment to an individual. Alternatively, this information may be generally informative, such as to indicate that a particular person has a health issue which affects their ability to communicate, or which is strongly likely to affect the reasons the person communicates with a particular entity.

Area 1508 indicates a complaint history. A complaint history indicates a history of complaints registered by the person with the entity that provides the interactive service for which the contextual active records are built and maintained. The complaint history may also indicate whether and how a particular complaint was resolved.

Area 1509 indicates a purchase history. A purchase history may indicate date of purchases, what was purchased, whether purchases were returned, and how purchases were paid for. Items purchases may also be categorized or organized by category.

Area 1511 indicates a physical address for a person. The physical address may include a variety of indicators, including zip code, neighborhood, street name, city name, state name, county name, country name, and so on. People in the same defined geographic area may be designated with a particular code, such as "Q29".

Additionally, address of a person may be indicated by an indication that the person is served by a particular piece of infrastructure equipment, such as a telephony switch, a particular cell tower, a particular water main, or other types of infrastructural information. In this way, a group of contextual active records can be searched and identified when an entity such as a utility wishes to update an interactive script for each individual served by a particular piece of infrastructure. Of course, a group of active records may also be updated to reflect that the persons identified by the active records belong to a particular group.

Area 1512 indicates family and friends who are also customers or subscribers of the entity. Relationship markers may be indicated here along with names and even account numbers of the family and friends.

Area 1513 indicates account passwords and identifiers, such as passwords and identifiers used to confirm identity. Account identifiers may also distinguish between several different accounts maintained by an entity for a person, such as checking account, savings account, and trading account, or alternatively such as auto insurance, home insurance, life insurance.

Area 1514 indicates income of the person. This information may be provided directly by the person, such as when the person applies for credit, or may be derived from estimates of income levels determined based on, for example, the person's occupation.

Area 1515 indicates community for the person. This information may indicate the community where the person lives, including informal community names.

Area 1516 indicates social networks and usernames. This information may include public data such as a Twitter™, Facebook™ or other social network username. As noted herein, an entity may periodically check public information about a person in order to update a contextual active record which is maintained for the person.

Area 1518 indicates upcoming dates. An upcoming date may be a birthday, graduation, family event, or other known information about a particular date that may be important to a person.

Area 1519 indicates upcoming events that go along with the upcoming dates in area 1518.

Area 1522 indicates customer/subscriber groupings. This indicator may be an internal indicator maintained by an entity to classify or categorize customers and subscribers.

Area 1523 indicates subscriptions. Subscriptions may be subscriptions provided by the entity, or know subscriptions provided by other entities. A subscription may include information of subscriptions such as mobile telephony plans, cable or internet service plans, and so on.

Area 1528 indicates escalation information. This information may indicate when a complaint has been escalated to a supervisory level, or when a complaint or question has gone unanswered or unresolved for longer than a predetermined threshold.

Area 1529 indicates a characteristic code. A characteristic code may be a shorthand arrangement of information arranged as an alphanumeric assembly of some or all of the information maintained in a contextual record. This characteristic code may be maintained as a way for an entity to search and identify particular persons by their active records, such as by searching for all persons living in area "Q29" with subscriptions to service "Z15". A complete characteristic code might be a predetermined number of characters arranged in a string, with each position in the string reserved to identify a particular type of information. Such a shorthand code can then be used as a searching mechanism for indexing contextual active records for multiple people, so that contextual active records can be updated along with interactive scripts prepared for each different person.

Area 1530 indicates a contact history, which may summarize individual contacts provided as contact #1 at area 1541, contact #2 at area 1542, and contact #3 at area 1542. A pattern of contact or contacts may be shown in area 1549. An example of a pattern may be the person calling a pharmacy repeatedly for prescription refills, and the pattern, once established, may lead to a personalized interactive script being prepared, such as to provide shortened introductory information and fewer questions.

As described herein, a contextual active record can be provided for an individual, so that an entity has a record of customers or potential customers, subscribers or potential subscribers, and so on. The use of the contextual active record is for preparing individual interactive scripts so that the entity is prepared for incoming communications from the person. The incoming communications may be telephony or internet communications over a network, and as noted herein additional contextual information can be provided even as the communication is being set up and even as the communication is in progress. In this way, an active record is not just a record prepared for a single communication as the communication takes place, but may be a record maintained for a person for as long as an entity expects the person to possibly initiate communications.

Another use case for the situational aware IVR is for a new customer, where the enriched session initiation protocol message is used to identify and greet the customer, but then also used to create a new contextual active record for the customer since no contextual active record exists. The contextual active record can be later updated using additional context information derived from the various sources described herein. The new contextual active record in this use case is used to invoke rules to select and/or modify a script of voice responses based on the contextual active record.

Accordingly, active records for interactive systems enables a situational aware IVR system to reduce or eliminate processing time. The time saved or eliminated may be time that would be spent by a human agent to collect information or resolve a concern. For example, if 10% of call time and calls are eliminated for the active records for interactive systems described herein, it may translate into thousands of calls per day and millions of dollars per year for a high-volume call recipient. Additionally, the enhanced processing also can help reduce hold times as calls are processed faster due to less time being spent by agents and IVR systems collecting information that can be obtained before calls are received or while calls are being processed.

Use of the systems described herein can improve net promoter scores, quality of (user) experiences, first call resolutions, and transfer rates.

Although active records for interactive systems has been described with reference to several exemplary embodiments, it is understood that the words that have been used are words of description and illustration, rather than words of limitation. Changes may be made within the purview of the appended claims, as presently stated and as amended, without departing from the scope and spirit of active records for interactive systems in its aspects. Although active records for interactive systems has been described with reference to particular means, materials and embodiments, active records for interactive systems is not intended to be limited to the particulars disclosed; rather active records for interactive systems extends to all functionally equivalent structures, methods, and uses such as are within the scope of the appended claims.

For example, active records for interactive systems is mainly described as using contextual information inserted into an intercepted session initiation protocol message. However, contextual information may also be retrieved based on a marker inserted into a session initiation protocol message, rather than information directly that is entirely placed into a session initiation protocol message. For example, an executable uniform resource locator (URL) address may be placed into a session initiation protocol message. Alternatively, the inserted information may be coded information that can be decoded and expanded at or by the situational-aware IVR, such as binary values to indicate male/female, race or ethnicity, religion, age, marital status, whether a caller is a customer or not, whether the caller has an ongoing complaint that has already been registered, and so on.

Additionally, while session initiation protocol has been specified as the message protocol used herein, any alternative message with a similar purpose and function can be used in the same manner as session initiation protocol messages. Such messages should be first sent and received before communications occur between a user and an interactive system such as an IVR, but otherwise alternative forms of electronic messages can be used in order to obtain the same results as described herein. Such messages are also not limited to internet protocol (IP) based networks, and can be used in networks that use other types of communication protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards noted herein may represent examples of the state of the art. Such standards are periodically superseded by re efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In accordance with an aspect of the present disclosure, a method of providing a personalized interactive service includes setting a profile of an individual for use by an entity that provides the interactive service. At least a portion of the profile is set independent of any network communication session between the individual and the entity. A personalized interactive script is personalized using a tangible processor and based on the profile. The personalized interactive script is personalized for the individual in the event that the individual initiates a communication with the entity to obtain the interactive service. The personalized interactive service is provided to the individual when the personalized interactive script is executed based on the individual initiating a communication session between the individual and the entity.

In accordance with another aspect of the present disclosure, an entirety of the profile is set independent of any network communication session between the individual and the entity.

In accordance with still another aspect of the present disclosure, the profile is first set when the individual establishes a contractual relationship with the entity.

In accordance with yet another aspect of the present disclosure, the profile is first set when the individual purchases a subscription.

In accordance with another aspect of the present disclosure, the profile is first set when the individual makes a purchase from the entity.

In accordance with still another aspect of the present disclosure, the method includes identifying, from an external source, information determined to relate to the individual and independent of any network communication session between the individual and the entity.

In accordance with yet another aspect of the present disclosure, the method also includes modifying the personalized interactive script based on the information from the external source determined to relate to the individual.

In accordance with another aspect of the present disclosure, the identifying occurs before any network communication session between the individual and the entity.

In accordance with still another aspect of the present disclosure, the identifying occurs between network communications between the individual and the entity.

In accordance with yet another aspect of the present disclosure, the service is provided by interacting with the individual in accordance with the personalized interactive script.

In accordance with another aspect of the present disclosure, the method also includes monitoring a resource external to the entity that sets the personalized interactive script for information that may relate to the individual. The method further includes determining that the information relates to the individual based on the monitoring. The method then includes modifying the profile based on the information determined based on the monitoring.

In accordance with still another aspect of the present disclosure, the setting, personalizing, monitoring and modifying all take place before the individual initiates the communication.

In accordance with yet another aspect of the present disclosure, identification of the information determined to relate to the individual results in modification of personalized interactive scripts for a plurality of individuals.

In accordance with another aspect of the present disclosure, the method also includes updating the profile based on information provided when the individual initiates the communication but before the interactive service is provided.

In accordance with still another aspect of the present disclosure, the profile of the individual is derived in part from a profile of a group that includes the individual.

In accordance with yet another aspect of the present disclosure, the method includes updating the profile based on communications from other individuals in locations determined to be proximate to the individual.

In accordance with another aspect of the present disclosure, the profile is updated based on information obtained from an online social network.

In accordance with still another aspect of the present disclosure, the method also includes determining, based on the profile, a set of potential reasons that the individual is initiating the communication; assigning a probability to each potential reason based on predetermined formulas, and providing the interactive service by initially asking the individual if they are initiating the communication based on the potential reason with the highest assigned probability.

In accordance with an aspect of the present disclosure, a computer apparatus includes a memory that stores instructions for providing a personalized interactive service, and a processor that executes the instructions. When executed by the processor, the instructions cause the processor to perform operations. The operations include setting a profile of an individual for use by an entity that provides the interactive service. At least a portion of the profile is set independent of any network communication session between the individual and the entity. The operations also include personalizing, using a tangible processor and based on the profile, a personalized interactive script for the individual in the event that the individual initiates a communication with the entity to obtain the interactive service. The operations also include providing the personalized interactive service to the individual when the personalized interactive script is executed based on the individual initiating a communication session between the individual and the entity.

In accordance with an aspect of the present disclosure, a tangible computer readable storage medium stores a computer program for providing a personalized interactive service. The computer program, when executed by a processor, causes a computer apparatus to perform a process that includes setting a profile of an individual for use by an entity that provides the interactive service. At least a portion of the profile is set independent of any network communication session between the individual and the entity. The process also includes personalizing, using a tangible processor and based on the profile, a personalized interactive script for the individual in the event that the individual initiates a communication with the entity to obtain the interactive service. The process also includes providing the personalized interactive service to the individual when the personalized interactive script is executed based on the individual initiating a communication session between the individual and the entity.

In accordance with an aspect of the present disclosure, a method includes intercepting a session initiation protocol message used to initiate a bidirectional communication and in transit to a networked recipient computer that provides interactive services for the bidirectional communication to be initiated. The method also includes obtaining, based on information in the session initiation protocol message, supplemental information to provide to the networked recipient computer of the communication to be initiated. The method further includes inserting, using a computer processor of an intermediary computer, the supplemental information into the session initiation protocol message, and routing the session initiation protocol message with the supplemental information inserted to the networked recipient computer that provides the interactive services for the bidirectional communication to be initiated.

In accordance with another aspect of the present disclosure, the method also includes providing the interactive services to a party initiating the bidirectional communication. The supplemental information includes contextual information descriptive of the party initiating the communication.

In accordance with yet another aspect of the present disclosure, the interactive services include IVR services. The IVR services are varied based on the supplemental information, so that interactive services provided to the party initiating the communication differ from interactive services provided to another party based solely on differences in supplemental information provided for communications initiated by the party initiating the communication and the another party.

In accordance with still another aspect of the present disclosure, the method further includes providing the interactive services to a party initiating the communication. The supplemental information includes a location of the party initiating the communication.

In accordance with another aspect of the present disclosure, the method also includes providing the interactive services to a party initiating the communication. The supplemental information includes information derived from a history of interactions between the party initiating the communication and a system that includes the networked recipient computer that provides the interactive services.

In accordance with another aspect of the present disclosure, the supplemental information is inserted into a header of the session initiation protocol message. The supplemental information may be small enough to include entirely in the header of a session initiation protocol message. However, the information provided in the header may include a marker or even an address to indicate another place where the supplemental information can be found. A marker in the header may indicate that context data can be found in the message body of the session initiation protocol message body. Further, truly large amounts of context data may be provided at an executable address placed in the header of the session initiation protocol message. A uniform resource locator (URL) can be used when the contextual data is dynamic in addition to when the contextual data is voluminous. As a result, a context manager can retrieve the contextual data as frequently as needed using the uniform resource locator associated with a particular party or account.

In accordance with still another aspect of the present disclosure, the session initiation protocol message is intercepted in a telecommunication provider network, supplemented in a session initiation protocol enrichment sub-system, and returned to the telecommunication provider network before reaching the networked recipient computer that provides the interactive services.

In accordance with another aspect of the present disclosure, the session initiation protocol enrichment sub-system includes a rule engine that uses predetermined rules to determine what supplemental information to insert into the session initiation protocol message.

In accordance with another aspect of the present disclosure, the method also includes providing the interactive services to a party initiating the communication. The method further includes updating the networked recipient computer that provides the interactive services, while the networked recipient computer provides the interactive services, with additional supplemental information obtained after the session initiation message is provided to the networked recipient computer.

In accordance with still another aspect of the present disclosure, the method further includes obtaining an analytics result from a telecommunication provider network by which the session initiation protocol message is provided. The method also includes providing supplemental content based on the analytics result from the networked interactive computer to a party initiating the communication.

In accordance with another aspect of the present disclosure, the method also includes sending an enriched session initiation protocol message back to a device used by a party to initiate the communication.

In accordance with another aspect of the present disclosure, the method also includes supplementing an existing contextual active record for a party initiating the communication with the supplemental information inserted into the session initiation protocol message.

In accordance with still another aspect of the present disclosure, the method further includes updating an existing script for the interactive services based on the contextual active record supplemented with the supplemental information.

In accordance with another aspect of the present disclosure, the method also includes updating an existing script for the interactive services based on the supplemental information inserted into the session initiation protocol message.

In accordance with an aspect of the present disclosure, a computer apparatus includes a memory that stores instructions, and a processor that executes the instructions. When executed by the processor, the instructions cause the processor to perform operations including intercepting a session initiation protocol message used to initiate a bidirectional communication and in transit to a networked recipient computer that provides interactive services for the bidirectional communication to be initiated. The operations also include obtaining, based on information in the session initiation protocol message, supplemental information to provide to the networked recipient computer of the communication to be initiated. The operations further include inserting the supplemental information into the session initiation protocol message, and routing the session initiation protocol message with the supplemental information inserted to the networked recipient computer that provides the interactive services for the bidirectional communication to be initiated.

In accordance with still another aspect of the present disclosure, the computer apparatus is an element in a session initiation protocol enrichment subsystem intermediate to the network computer that provides the interactive services and a party initiating the bidirectional communication.

In accordance with another aspect of the present disclosure, the session initiation protocol enrichment sub-system received the session initiation protocol message from a telecommunication provider network, and returns the session initiation protocol message with the supplemental information to the telecommunication provider network for routing to the networked recipient computer.

In accordance with another aspect of the present disclosure, the processor includes a call interceptor that intercepts the communication and decomposes the session initiation protocol message. The computer apparatus further includes a session initiation protocol message generator that regenerates the session initiation protocol message with the supplemental information, and provides the session initiation protocol message regenerated for distribution back to the telecommunication provider network.

In accordance with still another aspect of the present disclosure, the computer apparatus further includes a session initiation protocol rule engine that determines rules for supplementing the session initiation protocol message with supplemental content; and a database that stores the rules for supplementing the session initiation protocol message.

In accordance with an aspect of the present disclosure, a tangible computer readable storage medium stores a computer program. The computer program, when executed by a processor, causes a computer apparatus to perform a process that includes intercepting a session initiation protocol message used to initiate a bidirectional communication and in transit to a networked recipient computer that provides interactive services for the bidirectional communication to be initiated. The process also includes obtaining, based on information in the session initiation protocol message, supplemental information to provide to the networked recipient computer of the communication to be initiated. The process further includes inserting, using a computer processor of an intermediary computer, the supplemental information into the session initiation protocol message, and routing the session initiation protocol message with the supplemental information inserted to the networked recipient computer that provides the interactive services for the bidirectional communication to be initiated.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of providing a personalized interactive service via an interactive voice response server, comprising:

setting a profile of an individual for use by an entity that provides the personalized interactive service via the interactive voice response server, at least a portion of the profile being set independent of any network communication session between the individual and the entity;

intercepting a session initiation protocol message initiated by the individual using a Voice over Internet Protocol network, the intercepting being performed by a session initiated protocol enrichment system;

parsing the intercepted session initiation protocol message, and inserting first context information into a header of the intercepted session initiation protocol message by the session initiated protocol enrichment system to create an enriched session initiation protocol message;

returning the enriched session initiation protocol message to the Voice over Internet Protocol network for continued transmission;

receiving the enriched session initiation protocol message by the interactive voice response server;

generating second context information based on the profile of the individual, by the interactive voice response server accessing a memory having a profile database;

creating, by the interactive voice response server using a tangible processor, a personalized interactive script for the individual for use with the personalized interactive service, the personalized interactive script being based on the first context information and the second context information; and providing, via the interactive voice response server, the personalized interactive service to the individual when the personalized interactive script is executed based on the individual initiating a communication session between the individual and the entity, wherein the second context information includes (1) implicit contextual information, which is generated from calls automatically based on the session initiation protocol message, (2) explicit contextual information, which is obtained by communication with the individual and by searching a database managed by the entity that stores data relating to the individual, and (3) derived contextual information that does not already exist, which is generated by analyzing data relating to the individual and applying rules to the analyzed data.

2. The method of claim 1,
wherein an entirety of the profile is set independent of any network communication session between the individual and the entity.

3. The method of claim 1,
wherein the profile is first set when the individual establishes a contractual relationship with the entity.

4. The method of claim 3,
wherein the profile is first set when the individual purchases a subscription.

5. The method of claim 3,
wherein the profile is first set when the individual makes a purchase from the entity.

6. The method of claim 1, further comprising:
identifying, from an external source, information determined to relate to the individual and independent of any network communication session between the individual and the entity.

7. The method of claim 6, further comprising:
modifying the personalized interactive script based on the information from the external source determined to relate to the individual.

8. The method of claim 7,
wherein the identifying occurs before any network communication session between the individual and the entity.

9. The method of claim 7,
wherein the identifying occurs between network communications between the individual and the entity.

10. The method of claim 1, further comprising:
wherein the personalized interactive service is provided by interacting with the individual in accordance with the personalized interactive script.

11. The method of claim 1, further comprising:
monitoring a resource external to the entity that sets the personalized interactive script for information that may relate to the individual;
determining that the information relates to the individual based on the monitoring,
and modifying the profile based on the information determined based on the monitoring.

12. The method of claim 11,
wherein the setting, monitoring and modifying all take place before the individual initiates the communication.

13. The method of claim 12,
wherein identification of the information determined to relate to the individual results in modification of personalized interactive scripts for a plurality of individuals.

14. The method of claim 1, further comprising:
updating the profile based on information provided when the individual initiates a communication but before the personalized interactive service is provided.

15. The method of claim 1,
wherein the profile of the individual is derived in part from a profile of a group that includes the individual.

16. The method of claim 1, further comprising:
updating the profile based on communications from other individuals in locations determined to be proximate to the individual.

17. The method of claim 1,
wherein the profile is updated based on information obtained from an online social network.

18. The method of claim 1, further comprising:
determining, based on the profile, a set of potential reasons that the individual is initiating a communication;
assigning a probability to each potential reason based on predetermined formulas, and
providing the personalized interactive service by initially asking the individual if they are initiating the communication based on the potential reason with the highest assigned probability.

19. A computer system, comprising:
one or more memories that store instructions for providing a personalized interactive service via an interactive voice response server, and
one or more processors that execute the instructions,
wherein, when executed by the one or more processors, the instructions cause the one or more processors to perform operations comprising:
setting a profile of an individual for use by an entity that provides the personalized interactive service via the interactive voice response server, at least a portion of the profile being set independent of any network communication session between the individual and the entity;
intercepting a session initiation protocol message initiated by the individual using a Voice over Internet Protocol network, the intercepting being performed by a session initiated protocol enrichment sub-system;
parsing the intercepted session initiation protocol message, and inserting first context information into a header of the intercepted session initiation protocol message by the session initiated protocol enrichment sub-system to create an enriched session initiation protocol message;
returning the enriched session initiation protocol message to the Voice over Internet Protocol network for continued transmission;
receiving the enriched session initiation protocol message by the interactive voice response server;
generating second context information based on the profile of the individual, by the interactive voice response server accessing a memory having a profile database;
creating, by the interactive voice response server, a personalized interactive script for the individual for use with the personalized interactive service, the personalized interactive script being based on the first context information and the second context information; and
providing, via the interactive voice response server, the personalized interactive service to the individual when the personalized interactive script is executed based on the individual initiating a communication session between the individual and the entity,
wherein the second context information includes (1) implicit contextual information, which is generated from calls automatically based on the session initiation protocol message, (2) explicit contextual information, which is obtained by communication with the individual and by searching a database managed by the entity that stores data relating to the individual, and (3) derived contextual information that does not already exist, which is generated by analyzing data relating to the individual and applying rules to the analyzed data.

20. A tangible computer readable storage medium that stores a computer program for providing a personalized interactive service via an interactive voice response server, the computer program, when executed by a processor, causing a computer apparatus to perform a process comprising:

setting a profile of an individual for use by an entity that provides the personalized interactive service via the interactive voice response server, at least a portion of the profile being set independent of any network communication session between the individual and the entity;

intercepting a session initiation protocol message initiated by the individual using a Voice over Internet Protocol network, the intercepting being performed by a session initiated protocol enrichment system;

parsing the intercepted session initiation protocol message, and inserting first context information into a header of the intercepted session initiation protocol message by the session initiated protocol enrichment system to create an enriched session initiation protocol message;

returning the enriched session initiation protocol message to the Voice over Internet Protocol network for continued transmission;

receiving the enriched session initiation protocol message by the interactive voice response server;

generating second context information based on the profile of the individual, by the interactive voice response server accessing a memory having a profile database;

creating, by the interactive voice response server using a tangible processor, a personalized interactive script for the individual for use with the personalized interactive service, the personalized interactive script being based on the first context information and the second context information; and providing, via the interactive voice response server, the personalized interactive service to the individual when the personalized interactive script is executed based on the individual initiating a communication session between the individual and the entity, wherein the second context information includes (1) implicit contextual information, which is generated from calls automatically based on the session initiation protocol message, (2) explicit contextual information, which is obtained by communication with the individual and by searching a database managed by the entity that stores data relating to the individual, and (3) derived contextual information that does not already exist, which is generated by analyzing data relating to the individual and applying rules to the analyzed data.

* * * * *